US008022901B2

(12) United States Patent
Takahashi et al.

(10) Patent No.: US 8,022,901 B2
(45) Date of Patent: Sep. 20, 2011

(54) CURRENT CONTROL DRIVER AND DISPLAY DEVICE

(75) Inventors: Toshiro Takahashi, Minamiashigara (JP); Takuya Yoshimi, Minamiashigara (JP); Atsuo Ishizuka, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 1093 days.

(21) Appl. No.: 11/806,514

(22) Filed: May 31, 2007

(65) Prior Publication Data

US 2007/0279340 A1 Dec. 6, 2007

(30) Foreign Application Priority Data

Jun. 2, 2006 (JP) ................................ 2006-154719

(51) Int. Cl.
*G09G 3/30* (2006.01)
*G09G 3/32* (2006.01)
*G09G 5/00* (2006.01)
*G06F 3/038* (2006.01)

(52) U.S. Cl. ............... 345/76; 345/77; 345/82; 345/204

(58) Field of Classification Search .............. 345/55–99, 345/204

See application file for complete search history.

(56) References Cited

U.S. PATENT DOCUMENTS

| | | | | |
|---|---|---|---|---|
| 5,684,365 | A | 11/1997 | Tang et al. | |
| 6,501,466 | B1 | 12/2002 | Yamagishi et al. | |
| 7,369,187 | B2 * | 5/2008 | Park | 349/38 |
| 7,499,042 | B2 * | 3/2009 | Shirasaki et al. | 345/211 |
| 2003/0107560 | A1 * | 6/2003 | Yumoto et al. | 345/204 |

FOREIGN PATENT DOCUMENTS

WO WO-2005/064582 A2 7/2005

* cited by examiner

*Primary Examiner* — Alexander S Beck
*Assistant Examiner* — Charles Hicks
(74) *Attorney, Agent, or Firm* — Birch, Stewart, Kolasch & Birch, LLP

(57) ABSTRACT

In a current control driver that drives an active matrix device, a write current can be set larger and unevenness in currents can be reduced between elements receiving the currents. In the current control driver having an element circuit for each of the elements comprising a converting unit for converting an applied current into a voltage, a retaining unit for retaining the voltage converted by the converting unit, and a driving unit that converts the voltage retained by the retaining unit into an output current and supplies the output current, the converting unit is shared between two or more of the element circuits and a switch located between the shared converting units connects two or more of the converting units to one of the elements during a current supply period for the element.

20 Claims, 34 Drawing Sheets

CURRENT CONTROL DRIVER AND DISPLAY DEVICE

BACKGROUND OF THE INVENTION

1. Field of the Invention

The present invention relates to a display device comprising current control light emitting elements such as organic EL (Electro-Luminescence) elements laid out in the form of a matrix, wherein luminance of the elements is controlled in accordance with currents applied thereto.

The present invention also relates to a current control driver for driving current control elements in a device, wherein the elements are laid out in the form of a matrix.

2. Description of the Related Art

In an active matrix image display device, a plurality of pixels are laid out in the form of a matrix and an image is displayed by controlling intensity of light for each of the pixels according to luminance information supplied thereto. Liquid crystal display devices and organic EL display devices are known as specific examples of image display devices of this type. Liquid crystals are used as display elements that constitute each pixel in a liquid crystal display device, while organic EL elements are used in an organic EL display device. Organic EL elements that constitute each pixel of an organic EL display device are so-called self-luminous elements, and organic EL display devices are more advantageous than liquid crystal display devices with regard to higher image visibility, non-necessity of backlight, and higher response speed. The luminance of each light emitting element in an organic EL display device is controlled by an amount of current.

In an active matrix method, an active element inside each pixel, which is generally a TFT (Thin Film Transistor) as a type of FET (Field Effect Transistor), controls the amount of current flowing through a light emitting element of the pixel. U.S. Pat. No. 5,684,365 describes an example of an active matrix organic EL display device, and FIG. 31 shows an equivalent circuit thereof for one pixel (hereinafter referred to as Conventional Example 1). Each pixel in this circuit comprises an organic EL element OLED as a light emitting element, a first thin film transistor TFT1, a second thin film transistor TFT2, and a capacitor C. Since organic EL elements provide current rectification in many cases, organic EL elements are called organic light emitting diodes (OLEDs). Therefore, a symbol for a diode is used for the light emitting element OLED in FIG. 31. However, the light emitting element in this case is not necessarily this OLED, and any element whose luminance is controlled by the amount of current flowing therein may be used. In addition, the light emitting element does not necessarily carry out current rectification. In the example shown in FIG. 31, the source of P-channel TFT2 is connected to VDD (a power supply voltage), and the cathode of the light emitting element OLED is connected to a ground voltage. The anode of OLED is connected to the drain of TFT2. The gate of N-channel TFT1 is connected to a scanning line Scan while the source thereof is connected to a data line Data. The drain of TFT1 is connected to the capacitor C and the gate of TFT2.

In order to cause the pixel to operate in the above configuration, the scanning line Scan is firstly changed to a selected state and a voltage Vdata representing luminance information is applied to the data line Data. The transistor TFT1 then becomes conductive, and the capacitor C is either charged or discharged, to match a gate voltage of TFT2 with the data voltage Vdata. When the scanning line Scan is changed to a non-selected state, the transistor TFT1 becomes OFF. The transistor TFT2 is electrically disconnected from the data line Data, but the gate voltage of TFT2 is stably maintained by the capacitor C. A current flowing through OLED via TFT2 takes a value corresponding to a gate-source voltage Vgs of TFT2, and the light emitting element OLED continues to emit light at luminance according to the amount of current supplied via the transistor TFT2.

If Ids denotes a current flowing between the source and the drain of TFT2, Ids is the drive current flowing through OLED. If TFT2 operates in a saturation region, Ids is expressed by the following equation:

$$I_{ds} = \frac{1}{2}\mu C_{ox}\frac{W}{L}(V_{gs} - V_{th})^2 = \frac{1}{2}\mu C_{ox}\frac{W}{L}(V_{data} - V_{th})^2 \tag{1}$$

where Cox is a gate capacitance per unit area and represented by the following equation:

$$C_{ox} = \frac{\varepsilon_0\varepsilon_r}{d} \tag{2}$$

In the above equations, Vth, μ, W, L, ∈0, ∈r, and d respectively refer to a threshold value of TFT2, the mobility of carriers, a channel width, a channel length, a vacuum dielectric constant, the relative permittivity of a gate insulator, and the thickness of a gate insulator.

According to Equation (1) above, Ids is controlled by the voltage Vgs written into each pixel, and the luminance of the light emitting element OLED is controlled as a result. The reason why TFT2 is made to operate in the saturation region is that Ids is controlled only by Vgs in the saturation region and is not dependent on a drain-source voltage Vds. Therefore, the drive current Ids of a predetermined amount can be supplied to OLED even in the case where Vds fluctuates due to variations in the characteristics of OLED.

As has been described above, OLED in the circuit configuration shown in FIG. 31 continues to emit light at constant luminance once Vgs has been supplied thereto during one scanning period (one frame) until Vgs is supplied next time. By arranging a plurality of pixels 3 of such a type in the form of a matrix as shown in FIG. 32, an active matrix display device can be configured. As shown in FIG. 32, scanning lines Scan1 to ScanN for pixel selection during a predetermined scanning period (such as a frame period according to the NTSC standard) and data lines Data that feed luminance information (data voltage Vdata) for driving the pixels are laid out in the form of a matrix in a conventional display device. The scanning lines Scan1 to ScanN are connected to a scanning line driver 1 while the data lines Data are connected to a data line driver 2. A desired image can be displayed by repeating application of Vgs from the data lines Data by use of the data line driver 2 while sequentially selecting the scanning lines Scan1 to ScanN by use of the scanning line driver 1.

In a simple matrix display device, a light emitting element of each pixel emits light only at the instant that it is selected while the light emitting element of each pixel in the active matrix display device shown in FIG. 31 continues to emit light after writing has been completed. Therefore, instantaneous luminance can be lower than in a simple matrix display device and the amount of current for driving each light emitting element can be smaller, which are advantageous especially for large high-definition display devices.

As has been described above, TFTs that can be easily formed on glass substrates are generally used as active elements in an active matrix organic EL display device. Amorphous silicon and polysilicon used to form TFTs are not as crystalline as single crystal silicon, and the electric current conduction mechanism thereof is difficult to control. Therefore, TFTs formed by amorphous silicon or polysilicon show larger characteristic variations. Especially, in the case where polysilicon TFTs are formed on a comparatively large glass substrate, a laser annealing method is generally adopted in order to avoid problems such as deformation of the glass substrate caused by heat. However, uniform irradiation of laser energy on glass substrates of such a size is difficult, and variations in crystallization of polysilicon cannot be prevented from occurring, depending on positions in the substrate.

As a result, the threshold value (Vth) varies from pixel to pixel even among TFTs formed on the same substrate, and variation exceeding 1V is not rare in some cases. In such a case, Vth varies among pixels even if the signal voltage Vdata applied thereto is the same. Therefore, as shown by Equation (1) above, the current Ids flowing through OLED varies greatly from pixel to pixel, becoming far from a desired value. Consequently, high image quality, which is expected from a display device, cannot be achieved. The same phenomenon is observed not only in the voltage Vth but also in variations in carrier mobility μ. In addition, variations in each of the parameters cannot be avoided not only among pixels but also among production lots and products. In such a case, the data line voltage Vdata corresponding to the desired current Ids to flow through OLED needs to be set for each product according to resultant variations of the respective parameters in Equation (1). However, this process is unrealistic in mass production processes of display devices, and changes in the TFT characteristics caused by operating temperature, as well as temporal changes in the TFT characteristics caused by long term use, are extremely difficult to deal with.

U.S. Pat. No. 6,501,466 describes a configuration combining a power source and a current mirror circuit (hereinafter referred to as Conventional Example 2), in order to solve the problems of Conventional Example 1. The configuration is shown in FIG. 33. In Conventional Example 2, a current Iw corresponding to luminance is supplied between the source and the drain of TFT1 via TFT3, and TFT4 is in a conductive state at this time. A gate-source voltage of TFT1 becomes a value corresponding to the current Iw, and a capacitor C is set to the voltage. Thereafter, TFT4 becomes nonconductive and the voltage of the capacitor C, that is, a gate-source voltage of TFT2 is retained. Therefore, a current in accordance with the gate-source voltage flows between the source and the drain of TFT2 and to an organic EL element.

In the circuit of Conventional Example 2, the write current Iw to be applied from a data line needs to be set large in many cases compared to a current Idrv to flow through the light emitting element OLED. This is because the current to flow to OLED is generally up to several μA or the like at a maximum luminance but the current is approximately a dozen nA or slightly more for tones close to a minimal value of a 256-tone display, for example. Therefore, it is generally difficult for such a small current to be supplied accurately to the pixel circuit via the data line having a large capacitance.

In order to solve this problem, the current Iw can be increased by setting a value of (W2/W1)/(L2/L1) to be small where W1, W2, L1, and L2 respectively denote channel widths of TFT1 and TFT2, and channel lengths of TFT1 and TFT2 in the circuit shown in FIG. 33. However, in order to cause the large current Iw to flow, the value of W1/L1 needs to be increased for TFT1. In this case, the channel width W1 needs to be increased inevitably, since various limitations apply in decreasing the channel length L1. As a result, TFT1 occupies a large portion of a pixel area.

This fact usually means that the area that emits light becomes smaller in an organic EL display device in the case where pixels are uniform in size. As a result, reliability is lowered due to increase in current density, and power consumption increases due to increase in drive voltage. In addition, graininess is worsened due to the decrease in the light emitting area. Furthermore, this fact leads to reduction in the pixel size, which prevents the display from having higher resolution.

In order to solve these problems, U.S. Patent Application Publication No. 2003/0107560 proposes a driver (herein after referred to as Conventional Example 3) wherein a TFT is shared between pixels and a large size TFT is used to allow a large current to flow while a TFT area per pixel can be reduced. Hereinafter, the driver of Conventional Example 3 will be described with reference to FIG. 34. For the sake of simplification, circuits for two neighboring pixels in a column (pixels 1 and 2) are shown in FIG. 34.

In FIG. 34, a circuit P1 for the pixel 1 has an OLED (organic EL element) 11-1, a TFT 12-1, a capacitor 13-1, a TFT 14-1, and a TFT 15-1. The anode of OLED11-1 is connected to a positive power supply VDD. The drain of TFT12-1 is connected to the cathode of OLED11-1 while the source thereof is grounded. The capacitor 13-1 is connected between the gate of TFT12-1 and the ground (reference voltage point). The drain of TFT14-1 is connected to a data line 17 while the gate thereof is connected to a first scanning line 18A-1. The drain of TFT15-1 is connected to the source of TFT14-1 while the source thereof is connected to the gate of TFT12-1. The gate of TFT15-1 is connected to a second scanning line 18B-1.

Likewise, a circuit P2 of the pixel 2 has an OLED 11-2, a TFT 12-2, a capacitor 13-2, a TFT 14-2, and a TFT 15-2. The anode of OLED11-2 is connected to a positive power supply VDD. The drain of TFT12-2 is connected to the cathode of OLED11-2 while the source thereof is grounded. The capacitor 13-2 is connected between the gate of TFT12-2 and the ground. The drain of TFT14-2 is connected to the data line 17 while the gate thereof is connected to a first scanning line 18A-2. The drain of TFT15-2 is connected to the source of TFT14-2 while the source thereof is connected to the gate of TFT12-2. The gate of TFT15-2 is connected to a second scanning line 18B-2.

A so-called diode connection transistor TFT 16, whose gate and drain are electrically short-circuited, is shared between the circuits P1 and P2 for the two pixels. In other words, the drain and the gate of TFT16 are connected to the source of TFT14-1 and to the drain of TFT15-1 in the circuit P1 while the drain and the gate of TFT16 are also connected to the source of TFT14-2 and the drain of TFT15-2 in the circuit P2. The source of TFT16 is grounded.

In the example shown in FIG. 34, N-channel MOS transistors are used for TFT12-1 and TFT12-2 as well as for TFT16 while P-channel MOS transistors are used for TFT14-1 and TFT14-2 as well as TFT15-1 and TFT15-2.

In the pixel circuits P1 and P2 having the above configuration, TFTs 14-1 and 14-2 function as first scanning switches for selectively supplying a current Iw from the data line 17 to TFT16 while TFT16 functions as a converting unit that converts the current Iw applied from the data line 17 via TFT14-1 or TFT14-2 into a voltage. At the same time, TFT16 forms a current mirror circuit together with TFTs 12-1 and 12-2 that will be described later. The transistor TFT16 can be shared between the circuits P1 and P2 because TFT16 is used only at the time of applying the write current Iw.

The transistors TFT15-1 and TFT15-2 function as second scanning switches for selectively supplying the voltage converted by TFT16 to the capacitor 13-1 or 13-2. The capacitors 13-1 and 13-2 function as retaining units that retain the voltage converted from the current by TFT16 and supplied via TFT15-1 or TFT15-2. The transistors TFT12-1 and TFT12-2 function as driving units that cause OLEDs 11-1 or 11-2 to emit light by converting the voltage retained by the capacitor 13-1 or 13-2 into a current and by supplying the current to OLEDs 11-1 or 11-2. The elements OLED11-1 and OLED11-2 are electric optical elements whose luminance changes according to the current flowing therethrough.

The operation of luminance data writing in the driver having the above configuration will be described next. How luminance data are written in the pixel 1 will be described first. A current Iw in accordance with the luminance data is supplied to the data line 17 while the scanning lines 18A-1 and 18B-1 are both selected (that is, scanning signals ScanA1 and ScanB1 are both at a low level in this case). The current Iw is supplied to TFT16 via TFT14-1 that is in a conductive state. A voltage corresponding to the current Iw occurs at the gate of TFT16, by the current Iw flowing through TFT16. The voltage is retained by the capacitor 13-1.

The current corresponding to the voltage retained by the capacitor 13-1 is supplied to OLED11-1 via TFT12-1. In response, OLED11-1 starts to emit light. When the scanning lines 18A-1 and 18B-1 are set to non-selected states (that is, the scanning signals ScanA1 and ScanB1 are both at a high level), the writing operation of the luminance data to the pixel 1 is completed. The scanning line 18B-2 is in a non-selected state during this operation. Therefore, OLED11-2 of the pixel 2 is emitting light according to a voltage retained by the capacitor 13-2, and the state of light emission from OLED11-2 is not affected by the writing operation to the pixel 1.

The operation of luminance data writing to the pixel 2 will be described next. A current Iw corresponding to luminance data is supplied to the data line 17 while the scanning lines 18A-2 and 18B-2 are both in selected states (that is, scanning signals Scan A2 and B2 are at low level). A voltage corresponding to the current Iw is generated at the gate of TFT16 by the current Iw flowing through TFT16 via TFT14-2. The voltage is retained by the capacitor 13-2.

A current corresponding to the voltage retained by the capacitor 13-2 is supplied to OLED11-2 via TFT12-2. In response, OLED11-2 starts to emit light. The scanning line 18B-1 is in a non-selected state during this operation. Therefore, OLED11-1 of the pixel 1 is emitting light according to the voltage retained by the capacitor 13-1, and the state of light emission from OLED11-1 is not affected by the writing operation to the pixel 2.

As has been described above, TFT16 that carries out current-voltage conversion is shared between the two pixels in the driver of Conventional Example 3. Therefore, one transistor can be omitted for every two pixels. The current Iw flowing through the data line 17 is extremely large compared to currents flowing through OLEDs (organic EL elements), and the current-voltage converting TFT16 that directly deals with the large current Iw has a large size which occupies a large area. However, the current-voltage converting TFT16 is shared by the two pixels in this example, which enables TFT area reduction.

However, the combinations of TFTs which are shared between pixels are fixed in the driver in Conventional Example 3 described in U.S. Patent Application Publication No. 2003/0107560. Therefore, uneven display caused by differences in FET characteristics among the pixels cannot be avoided.

Although examples that use TFTs as active elements for controlling currents flowing through light emitting elements have been described above, the same problem occurs even if other active elements are used. In addition, the same problem also occurs not only in display devices but also optical scanning reading apparatuses or optical scanning recording apparatuses that adopt light emitting elements laid out in the form of a matrix and generate reading light or recording light of constant luminance whose value can be changed through sequential scanning of the elements.

SUMMARY OF THE INVENTION

The present invention has been conceived based on consideration of the above circumstances, and the present invention aims to enable a write current to be set large in a current control driver that drives an active matrix display device or the like and to reduce unevenness in currents flowing through elements, such as light emitting elements comprising an active matrix.

The present invention also aims to provide a display device that can drive light emitting elements with a large current and can reduce uneven display among pixels.

A current control driver of the present invention is a current control driver of an active matrix method in a device in which elements that receive current supply are laid out in the form of a matrix. In the current control driver, the elements are selected by sequential line scanning while output currents are controlled by applied currents from a plurality of data lines and are supplied respectively to the selected elements. The current control driver of the present invention comprises an element circuit for each of the elements, and the element circuit comprises:

a converting unit (T1) for converting a corresponding one of the applied currents into a voltage;

a retaining unit (Cs) for retaining the voltage converted by the converting unit; and a driving unit (T2) for converting the voltage retained by the retaining unit into a corresponding one of the output currents and supplying the output current. The current control driver is characterized by the current control driver having a configuration such that:

the converting unit is shared between two or more different element circuits; and two or more of the converting units are connected to the retaining unit of one of the elements during a current supply period for the element by a switch located between the shared converting units.

Specifically, it is preferable for the current control driver of the present invention to have:

the converting unit comprising a field effect transistor (T1) whose drain and gate are electrically short-circuited, the field effect transistor generating the voltage between the gate and the source thereof by the applied current from a corresponding one of the data lines;

the retaining unit comprising a capacitor (Cs) that retains the voltage generated between the gate and the source of the field effect transistor; and the driving unit comprising a field effect transistor that controls the output current based on the voltage retained by the capacitor.

More specifically, it is preferable for the current control driver of the present invention to have:

a first scanning switch (T4) for selectively conducting the applied current from the data line;

the converting unit (T1) for converting the current via the first scanning switch (T4) into the voltage;

a second scanning switch (T3) for selectively supplying the voltage converted by the converting unit;

the retaining unit for retaining the voltage supplied via the second scanning switch (T3);

the driving unit (T2) for converting the voltage retained by the retaining unit into the output current and supplying the output current; and a third scanning switch (T5) for allowing the converting unit (T1) to be shared by the two or more element circuits.

Further, it is preferable for the current control driver of the present invention to have:

the first scanning switch (T4) comprising a first field effect transistor (T4) connected to a first scanning line (ScanA);

the converting unit (T1) comprising a second field effect transistor (T1) whose drain and gate are electrically short-circuited, the second field effect transistor generating the voltage between the gate and the source thereof by the current supplied via the first field effect transistor (T4);

the second scanning switch (T3) comprising a third field effect transistor (T3) whose gate is connected to a second scanning line (ScanB);

the retaining unit comprising the capacitor that retains the voltage generated between the gate and the source of the second field effect transistor and supplied via the third field effect transistor (T3);

the driving unit (T2) comprising a fourth field effect transistor (T2) that is connected serially to a corresponding elements and drives the element based on the voltage retained by the capacitor; and the third scanning switch (T5) comprising a fifth field effect transistor (T5) whose gate is connected to a third scanning line (ScanC).

The current control driver of the present invention may be configured in such a manner that, upon the current supply to each of the selected element circuits, the element circuit thereof shares the converting unit of an immediately preceding or following one of the element circuits along a scanning direction.

In the current control driver of the present invention, it is preferable for the transistors comprising the converting unit and the driving unit to be N-channel MOS transistors while it is preferable for the transistors comprising the scanning switches to be P-channel MOS transistors, which is not necessarily limited thereto.

A display device of the present invention is a display device comprising a current control driver of an active matrix method and having light emitting elements such as organic EL elements laid out in the form of a matrix wherein luminance of the elements changes in accordance with currents applied thereto. In the current control driver, the elements that receive current supply are selected by sequential line scanning while output currents are controlled by the applied currents from a plurality of data lines and are supplied respectively to the selected elements. The current control driver in the display device comprises a pixel circuit for each of the light emitting elements, and the pixel circuit comprises:

a converting unit (T1) for converting a corresponding one of the applied currents into a voltage;

a retaining unit (Cs) for retaining the voltage converted by the converting unit; and a driving unit (T2) for converting the voltage retained by the retaining unit into a corresponding one of the output currents and supplying the output current. The display device is characterized by the display device having a configuration such that the converting unit is shared between two or more of the pixel circuits that are different from each other, and two or more of the converting units are connected to the retaining unit of one of the light emitting elements during a current supply period for the light emitting element by a switch located between the shared converting units.

Specifically, it is preferable for the display device of the present invention to have:

the converting unit comprising a field effect transistor (T1) whose drain and gate are electrically short-circuited, the field effect transistor generating the voltage between the gate and the source thereof by the applied current from a corresponding one of the data lines;

the retaining unit comprising a capacitor (Cs) that retains the voltage generated between the gate and the source of the field effect transistor; and the driving unit comprising a field effect transistor that controls the output current based on the voltage retained by the capacitor.

More specifically, it is preferable for the display device of the present invention to have:

a first scanning switch (T4) for selectively conducting the applied current from the data line;

the converting unit (T1) for converting the current via the first scanning switch (T4) into the voltage;

a second scanning switch (T3) for selectively supplying the voltage converted by the converting unit;

the retaining unit for retaining the voltage supplied via the second scanning switch (T3);

the driving unit (T2) for converting the voltage retained by the retaining unit into the output current and supplying the output current; and a third scanning switch (T5) for allowing the converting unit (T1) to be shared by the two or more of the pixel circuits.

Further, it is preferable for the display device of the present invention to have:

the first scanning switch comprising a first field effect transistor (T4) connected to a first scanning line (ScanA);

the converting unit (T1) comprising a second field effect transistor (T1) whose drain and gate are electrically short-circuited, the second field effect transistor generating the voltage between the gate and the source thereof by the current supplied via the first field effect transistor (T4);

the second scanning switch comprising a third field effect transistor (T3) whose gate is connected to a second scanning line (ScanB);

the retaining unit comprising the capacitor that retains the voltage generated between the gate and the source of the second field effect transistor and supplied via the third field effect transistor (T3);

the driving unit (T2) comprising a fourth field effect transistor (T2) that is connected serially to a corresponding one of the light emitting elements and drives the light emitting element based on the voltage retained by the capacitor; and the third scanning switch (T5) comprising a fifth field effect transistor (T5) whose gate is connected to a third scanning line (ScanC).

The display device of the present invention may be configured in such a manner that, upon the current supply to each of the selected light emitting elements, the pixel circuit thereof shares the converting unit of an immediately preceding or following one of the pixel circuits along a scanning direction.

In the display device of the present invention, it is preferable for the transistors comprising the converting unit and the driving unit to be N-channel MOS transistors while it is preferable for the transistors comprising the scanning switches to be P-channel MOS transistors, which is not necessarily limited thereto.

In the current control driver of the present invention, each of the converting units is shared between two or more different element circuits, and two or more of the converting units are connected to the retaining unit of each of the elements during the current supply period for the element by the switch located between the shared converting units. Therefore, a larger write current can be applied compared to a conventional current control driver wherein one converting unit is connected to one retaining unit, since the number of the converting units is larger than in the conventional current control driver.

Since the retaining unit of each of the elements is connected to a plurality of the converting units by the switch or switches in the current control driver of the present invention, each of the converting units can be connected to the retaining units of one of the elements and another one or other ones of the elements. Therefore, differences in characteristics of the elements such as TFTs comprising the converting units can be averaged among the retaining units (that is, among the elements), which leads to reduction in unevenness in currents among the elements comprising the active matrix.

Furthermore, since the display device of the present invention comprises the current control driver of the present invention described above, the light emitting elements can be driven by a large current and uneven display between the pixels can be suppressed by reduction of unevenness in currents among the light emitting elements.

DESCRIPTION OF THE PREFERRED EMBODIMENTS

Hereinafter, embodiments of the present invention will be described with reference to the accompanying drawings.

Figure 1:
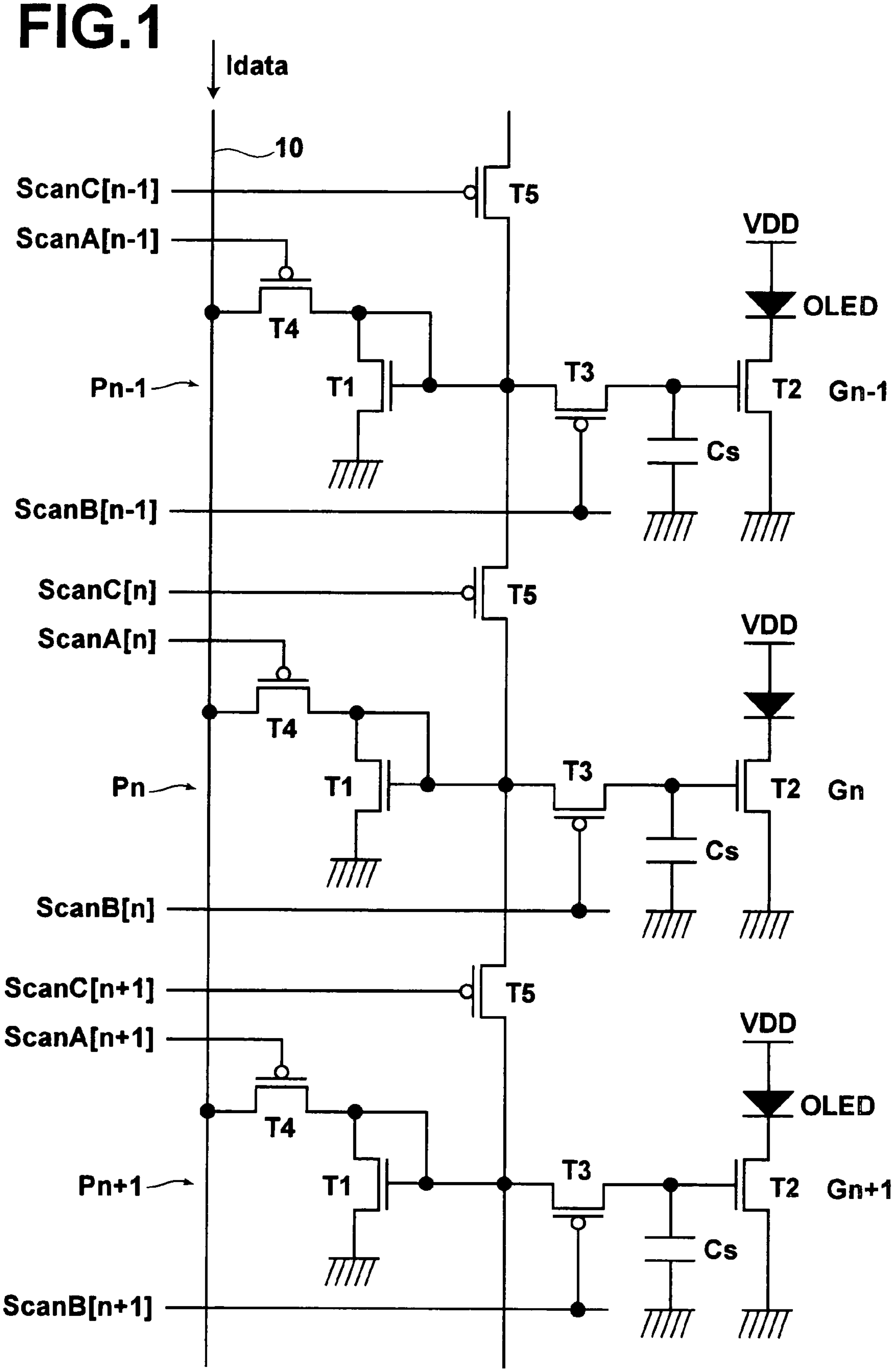
FIG. 1 is a diagram of a circuit showing a current control driver of a first embodiment of the present invention.
Figure 32:
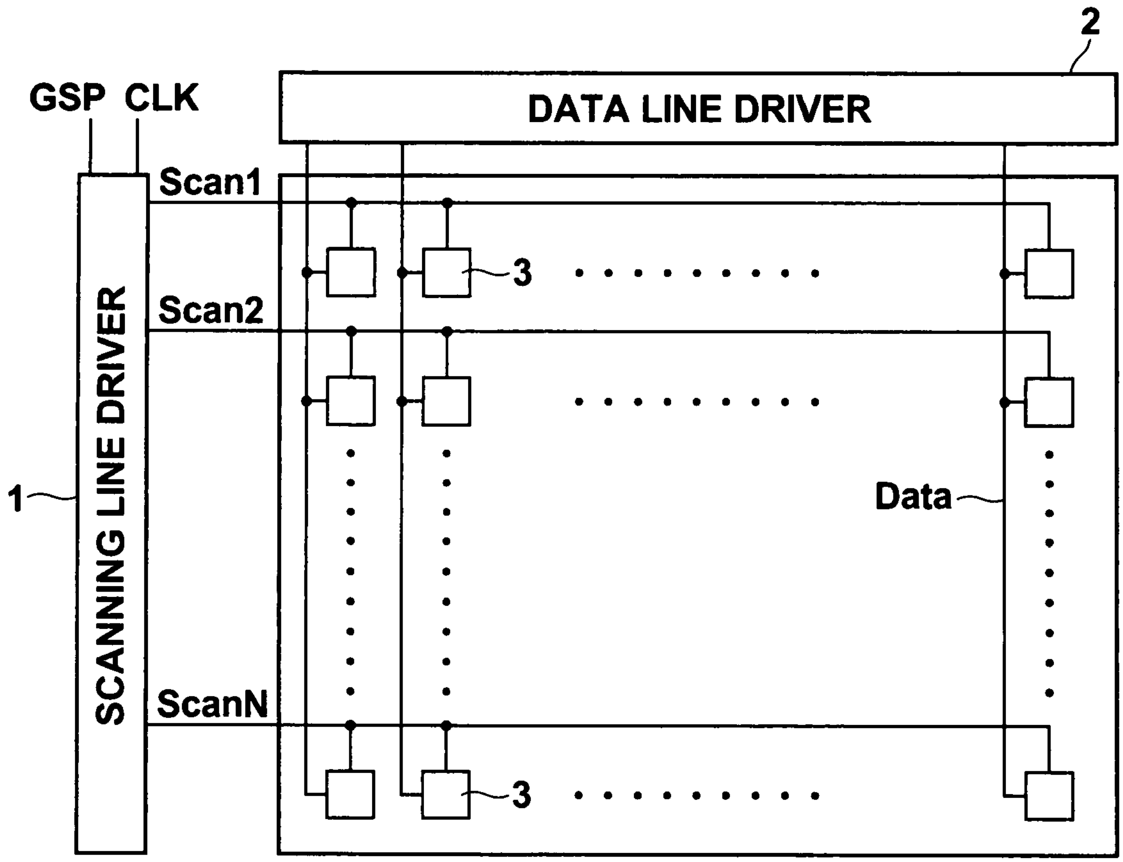
FIG. 32 is a block diagram showing a conventional current control driver.
Figure 33:
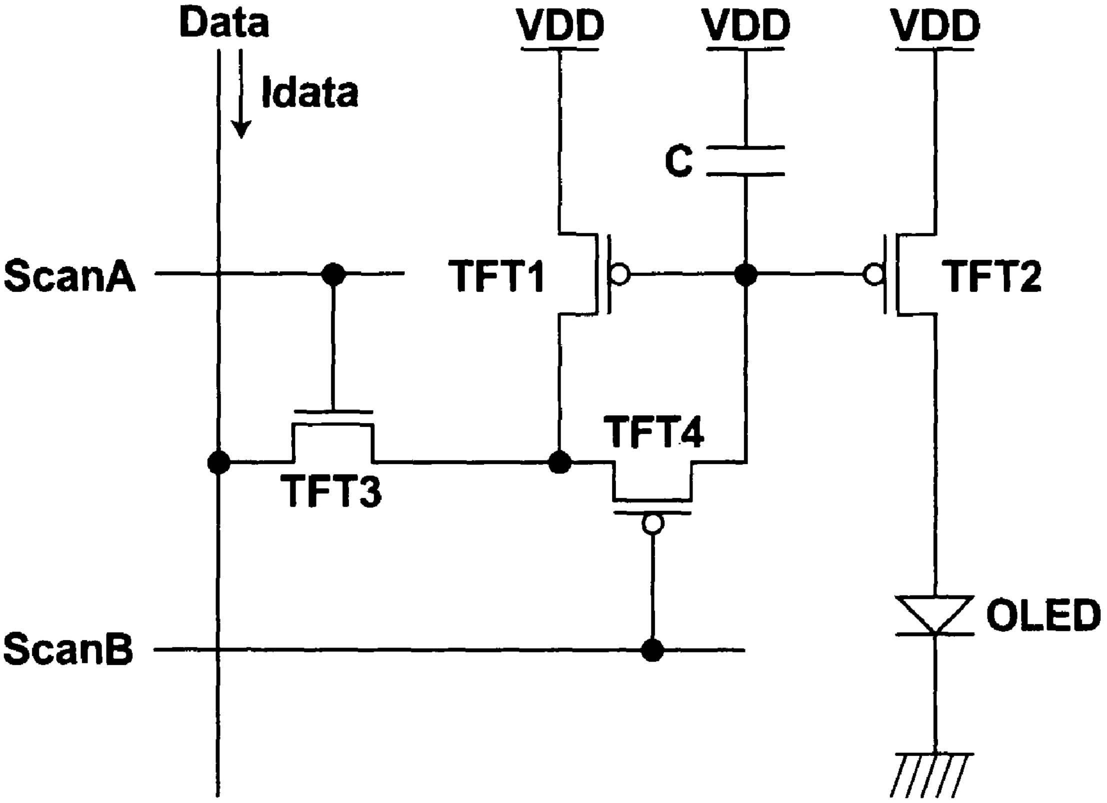
FIG. 33 is a circuit diagram showing another example of a conventional current control driver.
Figure 34:
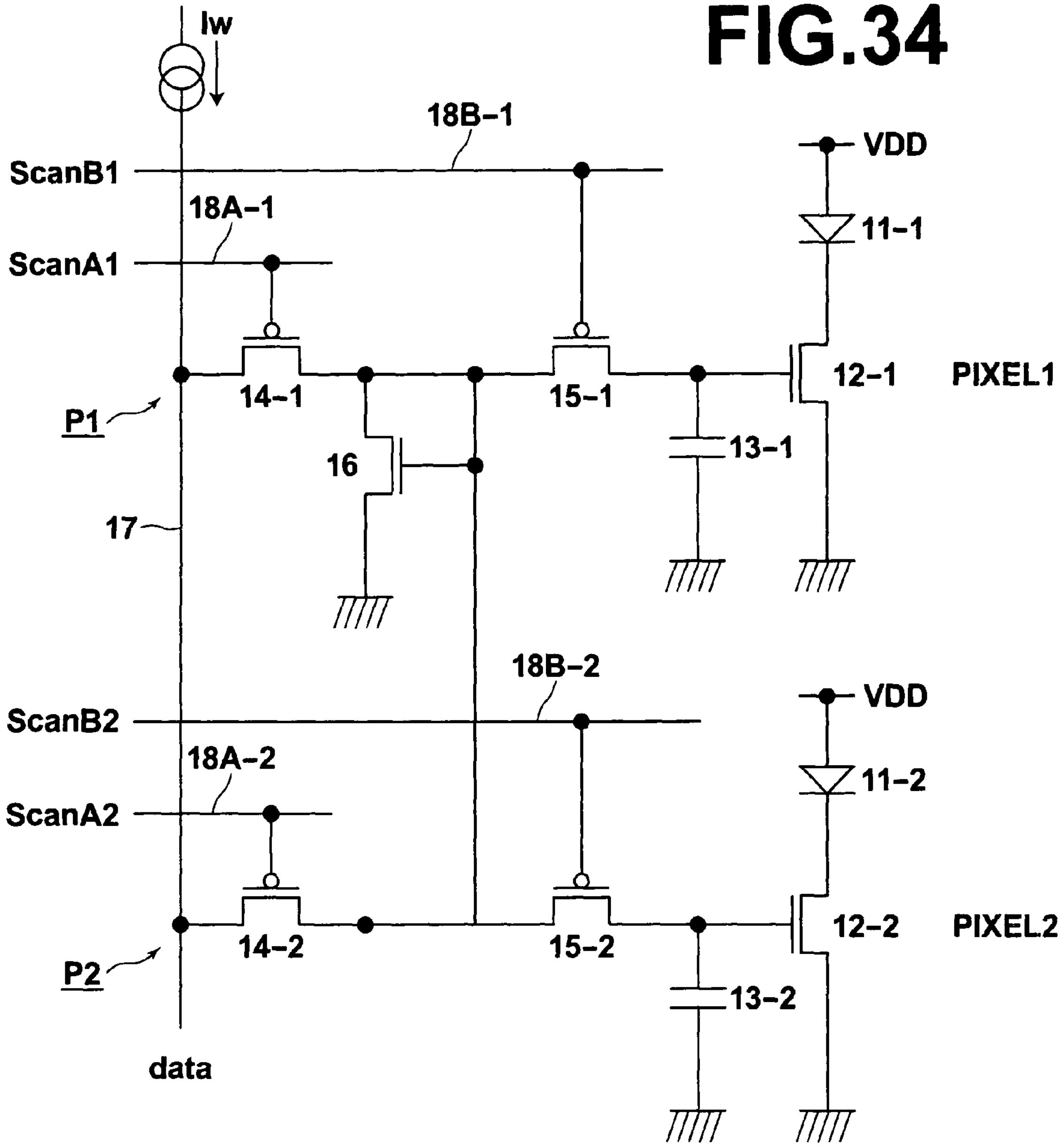
FIG. 34 is a circuit diagram showing still another example of a conventional current control driver.

FIG. 1 shows a current control driver of a first embodiment of the present invention. This current control driver is for driving OLEDs (organic EL elements) of an organic EL display device as an example, and only circuits for 3 pixels (pixels Gn−1, Gn, and Gn+1) aligned consecutively in a column are shown for the sake of simplification. The current control driver shown in FIG. 1 is connected to the previously described scanning line driver 1 and the data line driver 2 shown in FIG. 32 to comprise the display device. In this embodiment, 3 scanning lines are used for each row as will be described later.

In the current control driver in this embodiment, a circuit Pn for a pixel Gn comprises an organic EL element (OLED), a capacitor (Cs), and TFTs (T1, T2, T3, T4 and T5). The anode of OLED is connected to a positive power source VDD. The drain of T2 is connected to the cathode of OLED and the source thereof is grounded. The capacitor Cs is connected between the gate of T2 and a ground (a reference voltage point). The drain of T4 is connected to a data line 10 while the gate thereof is connected to a first scanning line ScanA[n]. The drain of T3 is connected to the source of T4 while the source thereof is connected to the gate of T2. The gate of T3 is connected to a second scanning line ScanB[n]. The drain and the gate of T1 are electrically short-circuited to form a so-called diode connection and connected to the source of T4 and the drain of T3, respectively. The source of T1 is grounded. The gate of T5 is connected to a third scanning line ScanC[n] and the drain thereof is connected to the drain of T3.

In this embodiment, N-channel MOS FETs are used as T1 and T2 while P-channel MOS FETs are used as T3, T4, and T5.

As shown in FIG. 1, circuits Pn−1 and Pn+1 for the pixels Gn−1 and Gn+1 are basically formed in the same manner as the circuit Pn for the pixel Gn. The drain and the source of T5 of each of the pixel circuits are respectively connected to the source and the drain of T5 in the neighboring pixel circuits.

In the circuit Pn−1, Pn, or Pn+1 having the above configuration, T4 functions as a first scanning switch for selectively supplying a current Idata from the data line 10 to T1. The transistor T1 functions as a converting unit for converting the current Idata supplied from the data line 10 via T4 into a voltage, and T1 also forms a current mirror, circuit together with the transistor T2.

The transistor T3 functions as a second scanning switch for selectively supplying the voltage converted from the current by T1 to the capacitor Cs. The capacitor Cs functions as a retaining unit for retaining the voltage converted from the current by T1 and supplied via T3. The transistor T2 converts the voltage retained by the capacitor Cs into a current, and causes OLED to emit light by supplying the current to OLED. In other words, T2 functions as a driving unit. The element OLED is an electric optical element whose luminance changes according to the current flowing therethrough.

Figure 2:
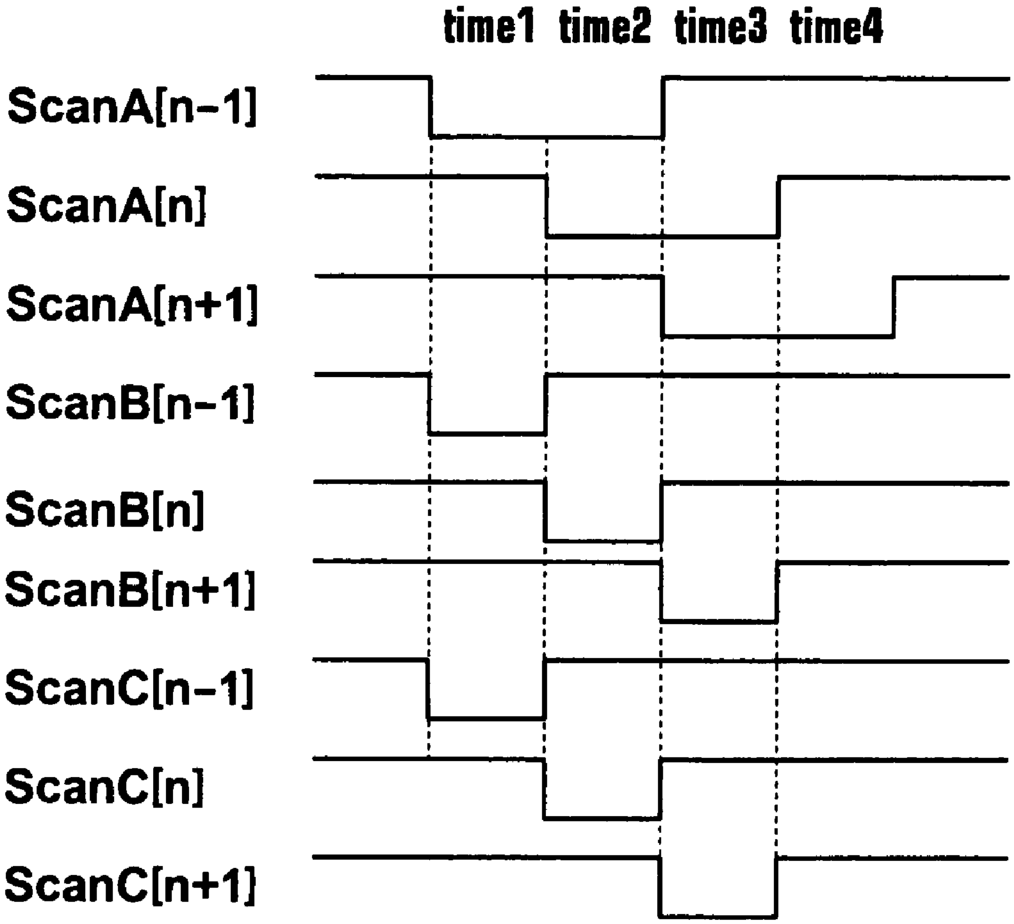
FIG. 2 is a timing chart showing how scanning lines are selected in the circuit in FIG. 1.

The operation of writing luminance data in the circuit Pn−1, Pn, or Pn+1 of the above configuration will be described. As has been described above, the first to third scanning lines ScanA, ScanB, and ScanC are located for one row in this embodiment. How the three scanning lines are selected in each row, that is, the scanning lines ScanA[n−1], ScanB[n−1], and ScanC[n−1] for a row n−1, the scanning lines ScanA[n], ScanBB[n], and ScanC[n] for a row n, and the scanning lines Scan[n+1], ScanB[n+1], and ScanC[n+1] for a row n+1, is basically shown by a timing chart shown in FIG. 2. In FIG. 2, the low level of each waveform refers to a state of the corresponding line being selected while the high level thereof refers to a non-selected state.

Figure 3:
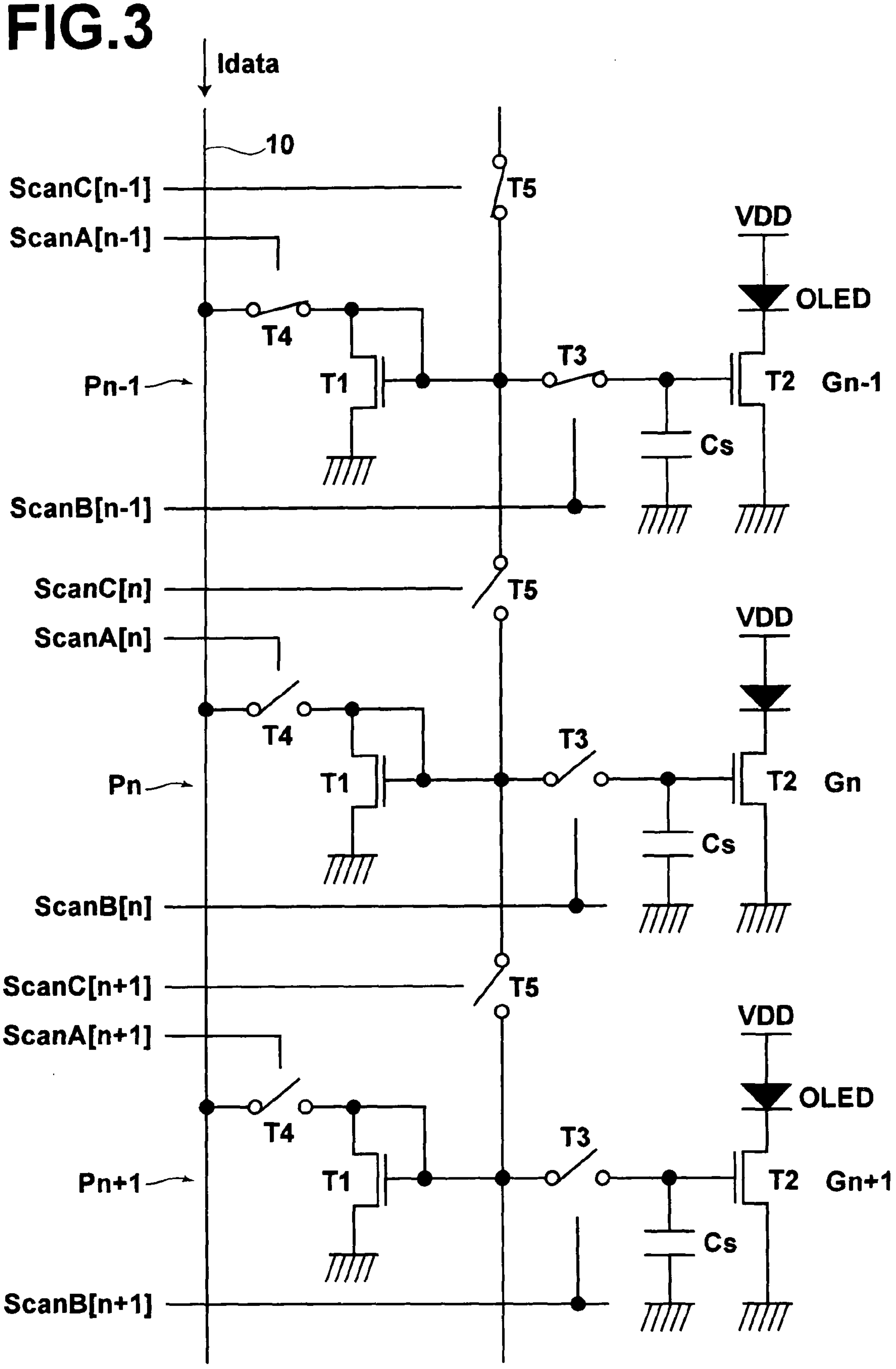
FIG. 3 is a circuit diagram showing one state of operation in the circuit shown in FIG. 1.
Figure 4:
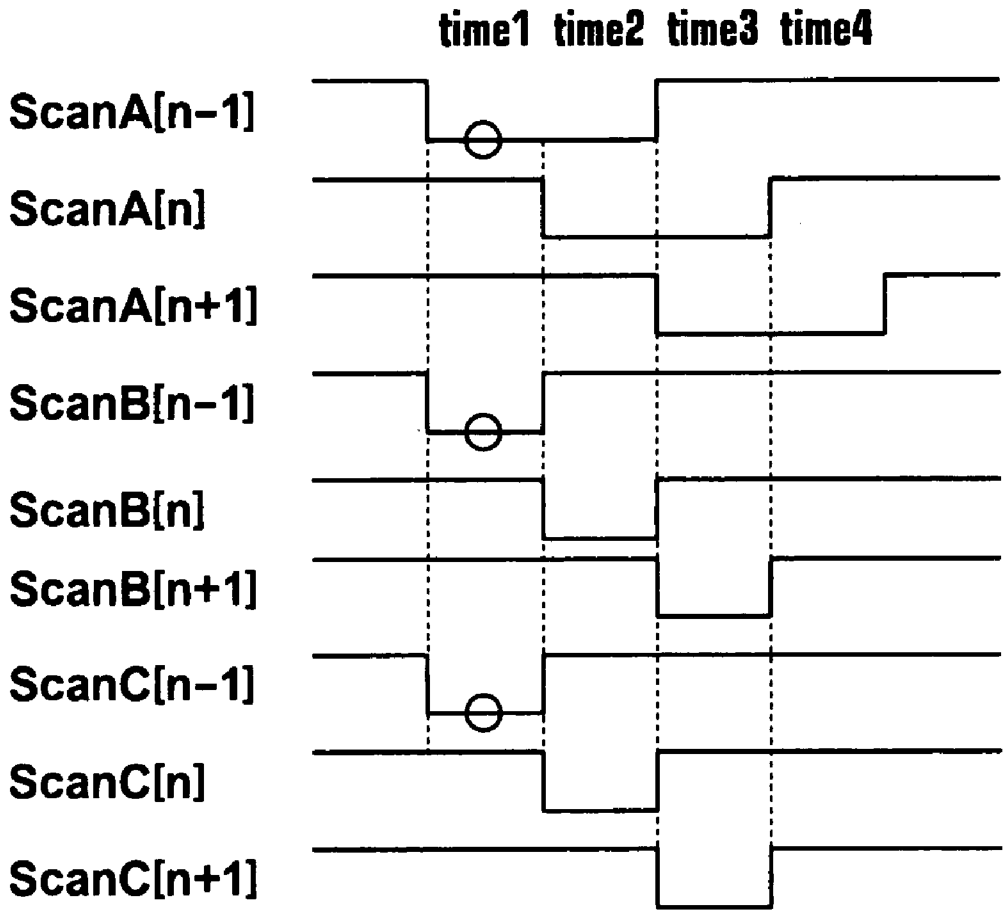
FIG. 4 is a timing chart showing how the scanning lines are selected for the state of operation shown in FIG. 3.

At the time of writing in the row n−1, for example, the three scanning lines ScanA[n−1], ScanB[n−1], and ScanC[n−1] are all in selected states in a write period time1 as shown by circles shown in a timing chart in FIG. 4, and the transistors T4, T3, and T5 in the row n−1 are all changed to become conductive as shown in FIG. 3. In FIG. 3 (and hereinafter), the transistors T4, T3 and T5 are shown as symbols representing switches, for the sake of easier understanding of conductive or non-conductive states.

Figure 5:
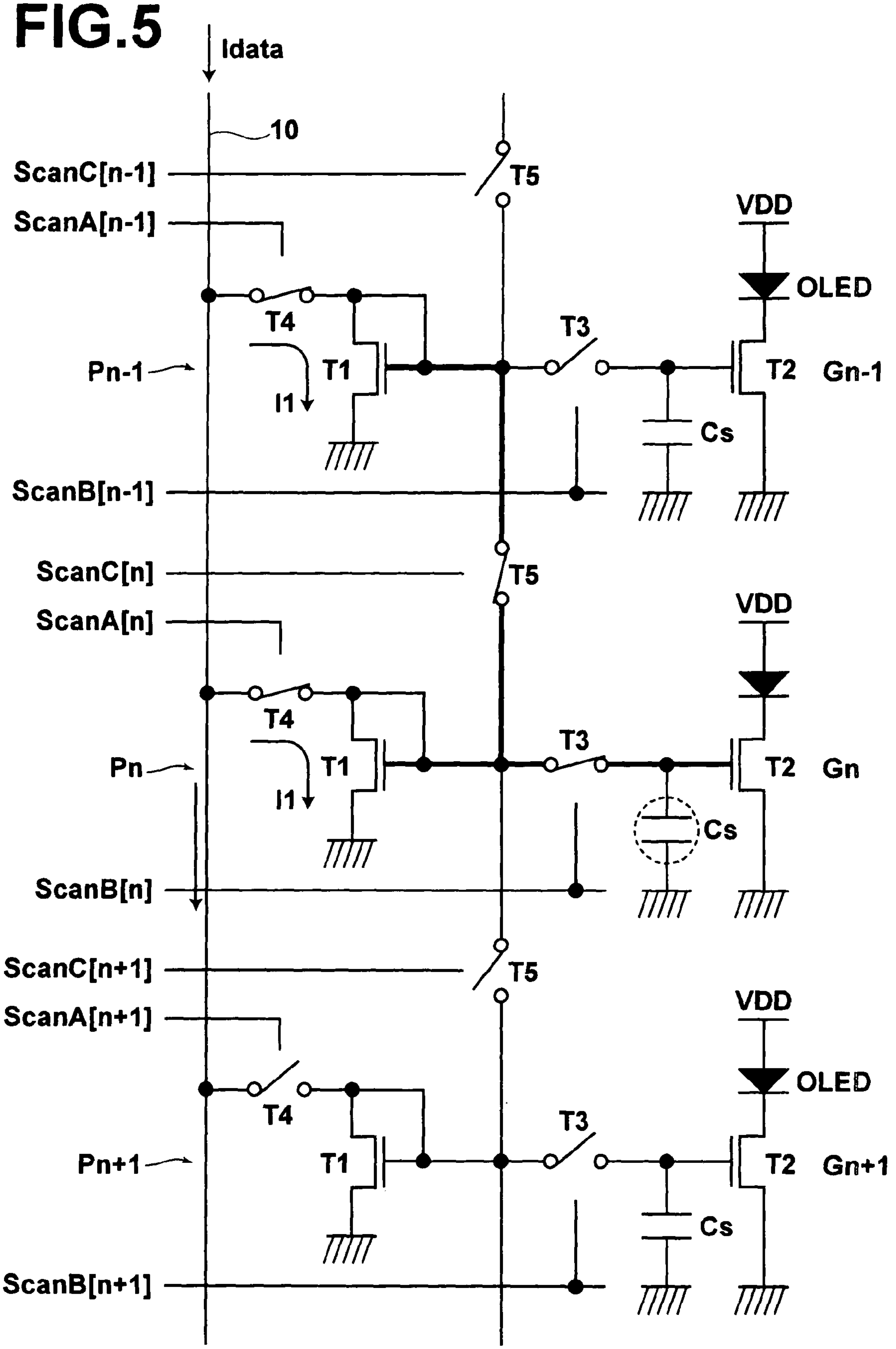
FIG. 5 is a circuit diagram showing another state of operation in the circuit in FIG. 1.
Figure 6:
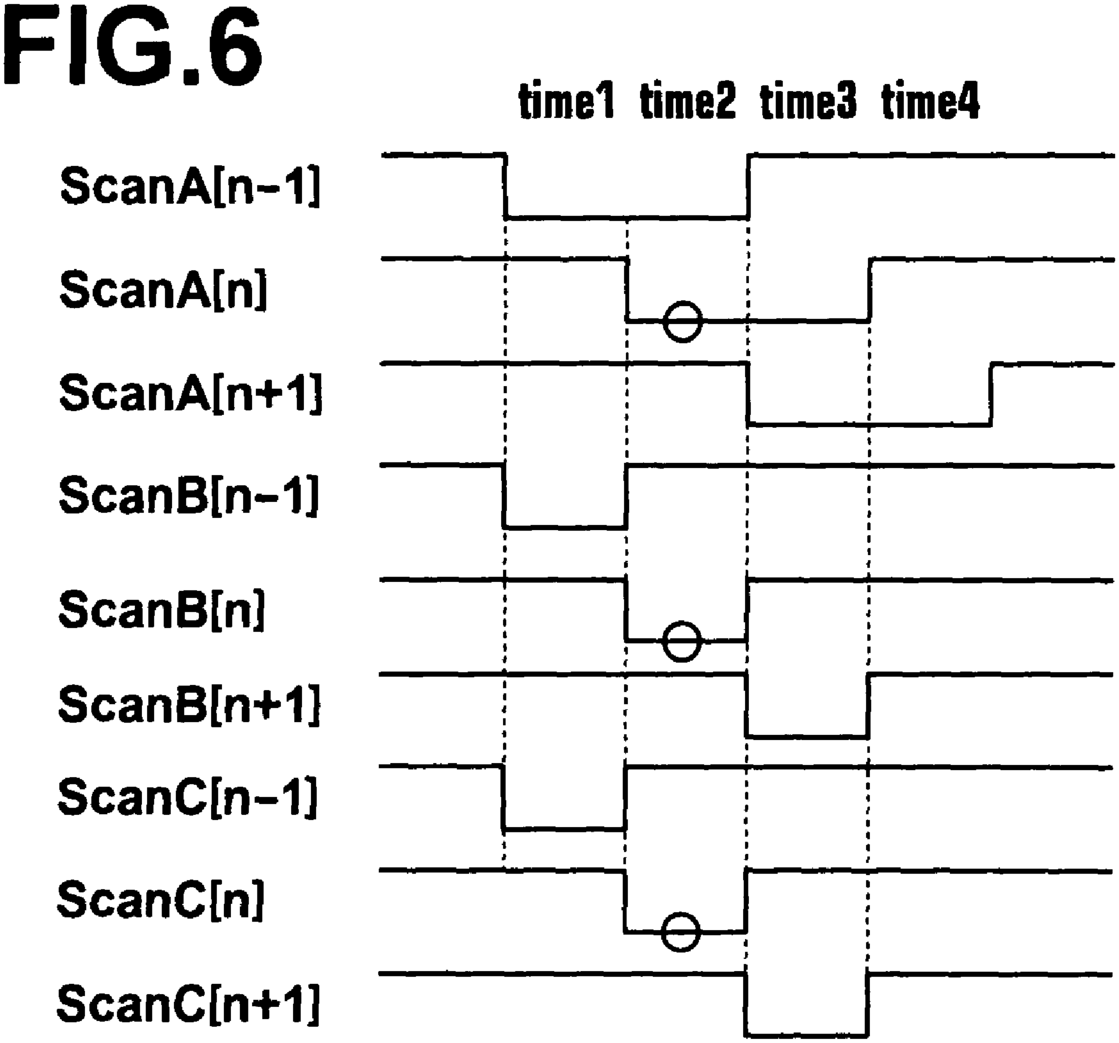
FIG. 6 is a timing chart showing how the scanning lines are selected for the state of operation of the circuit shown in FIG. 5.

At the time of writing in the row n, the three scanning lines ScanA[n], ScanB[n], and ScanC[n] are all selected in a write period time2 as shown by circles in a timing chart shown in FIG. 6. In response, the transistors T4, T3, and T5 in the row n are set to become conductive as shown in FIG. 5. A current Idata in accordance with luminance data is supplied to the data line 10 in this state. The current Idata is supplied to T1 via T4 that is in the conductive state. By the current Idata flowing through T1, a voltage corresponding to the current Idata occurs at the gate of T1. The voltage is retained by the capacitor Cs via T3 that is in the conductive state.

As shown by FIG. 6, the scanning line ScanA[n−1] for the immediately preceding row n−1 is also in the selected state in the write period time2. Therefore, T4 in the row n−1 is also in a conductive state as shown by FIG. 5. In addition, the scanning line ScanC[n] is selected and T5 of the row n is in the conductive state. (At this time, T5 and T3 for the row n−1 are not conductive). Therefore, T1 of the row n−1 and T1 of the row n are in parallel connection, and the drain-gate voltage generated by the current Idata is averaged and retained by the capacitor Cs.

A current in accordance with the voltage retained by the capacitor Cs flows to OLED via T2. In this manner, OLED starts emission of light. When the scanning lines ScanB[n], ScanC[n] and ScanA[n−1] become non-selected thereafter (that is, at high level), the operation of writing the luminance data to the pixel Gn is completed. In FIG. 5 (and hereinafter), the capacitor Cs retaining the voltage is surrounded by a broken circle.

As has been described above, this embodiment has been designed to let the current Idata flow also in T1 of the row n−1, which is the immediately preceding row in the scanning order, upon writing into the pixel Gn in the row n. Therefore, if I1 refers to a current that causes emission of light at a minimum value of the write current Idata, that is, at a minimum luminance value, the data line 10 allows a current whose value is double of I1 to flow therethrough. Allowing the larger current to flow through the data line 10 leads to writing by the accurate current Idata corresponding to a desired luminance value while reducing effects caused by a wiring capacitance and a driver capacitance.

Furthermore, in this embodiment, the current determined by a characteristic of T1 in the row n as well as T1 in the row n−1 is supplied to OLED upon writing in the pixel Gn of row n. Likewise, upon writing in the pixel Gn+1 in the row n+1, a current determined by the characteristic of T1s in the rows n+1 and n is supplied to OLED. Therefore, even in the case where the characteristic varies between T1s in the respective rows, the characteristic is averaged. Consequently, large fluctuation due to the variation in the characteristic of T1s can be prevented in the currents supplied to OLEDs, and uneven display (uneven luminance) between the pixels can be suppressed.

Figure 7:
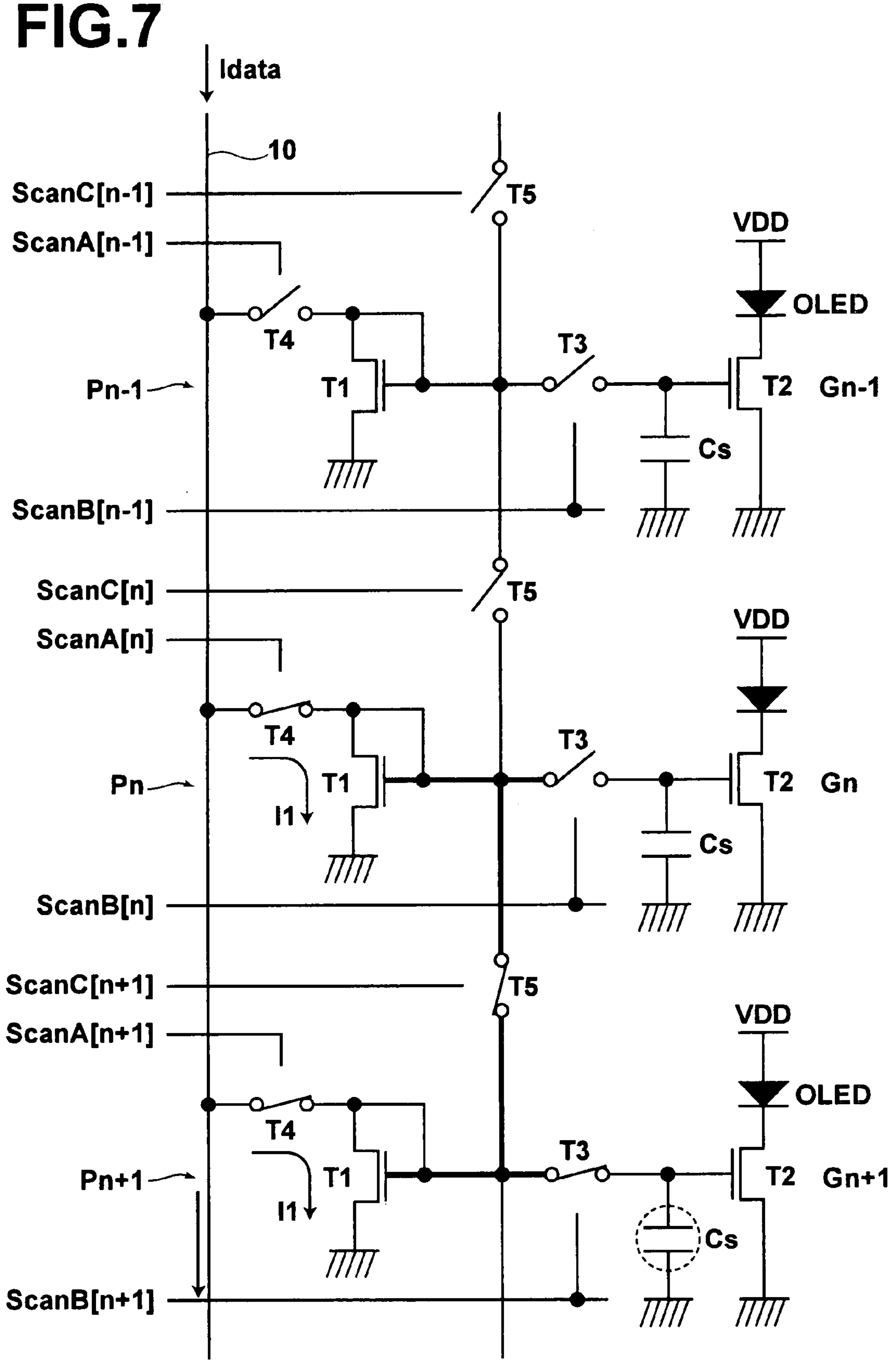
FIG. 7 is a circuit diagram showing still another state of operation of the circuit shown in FIG. 1.
Figure 8:
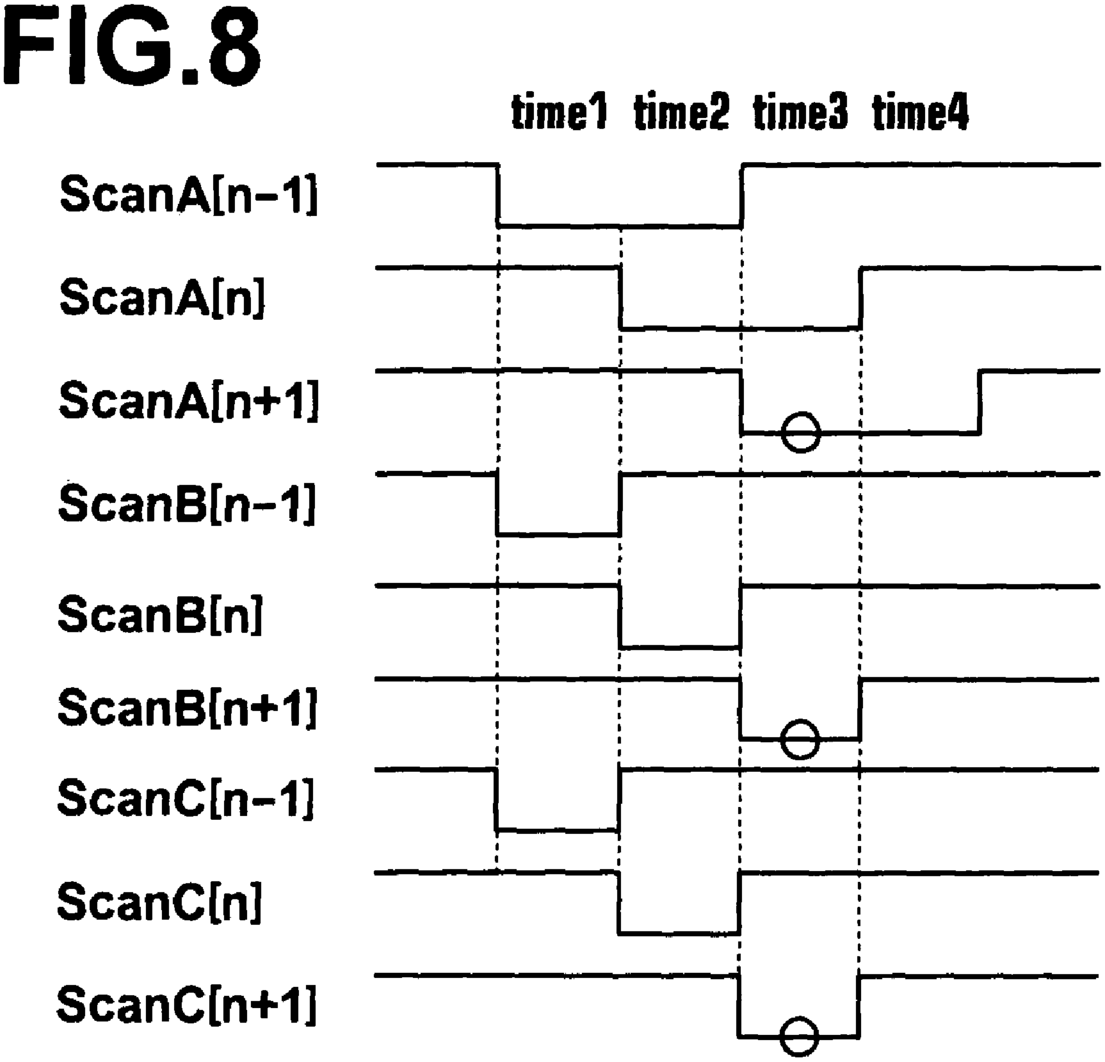
FIG. 8 is a timing chart showing how the scanning lines are selected for the state of operation of the circuit shown in FIG. 7.

At the time of writing in the row n+1, the three scanning lines ScanA[n+1], ScanB[n+1], and ScanC[N+1] are all in selected states at a write period time3 as shown by the circles in a timing chart in FIG. 8. The scanning line ScanA[n] is also in the selected state in the write period time3. Therefore, the circuit is in a state shown in FIG. 7, and a current Idata in the data line 10 flows in T1s of the rows n+1 and n in the write period time3. Consequently, a larger current can be supplied to the data line 10, and writing can be carried out by the accurate current Idata corresponding to a desired luminance value while the effects caused by wiring capacitance and driver capacitance can be reduced. Uneven display (uneven luminance) between the pixels caused by variation in the characteristic of T1s can also be reduced, as has been described above.

Figure 9:
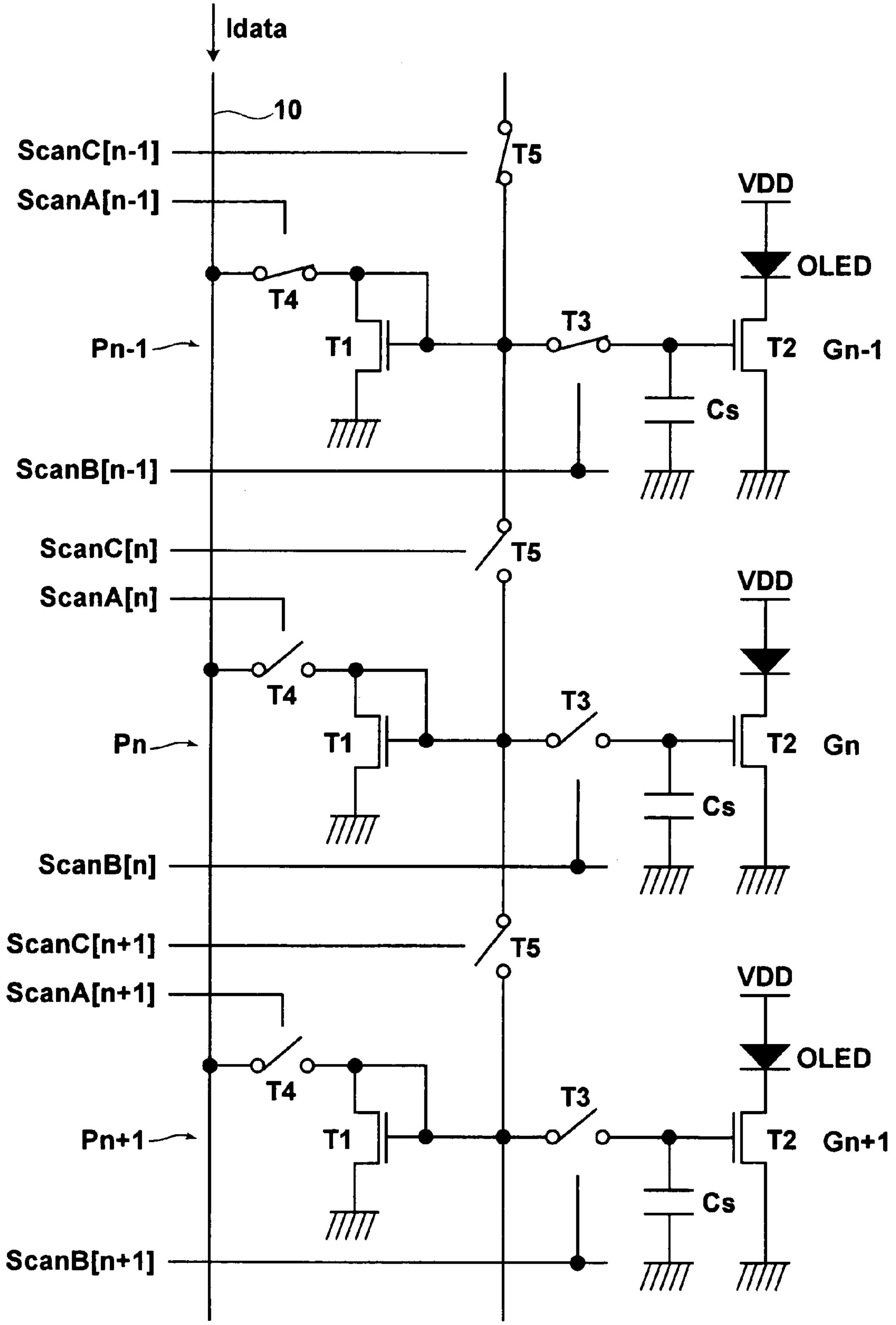
FIG. 9 is a diagram of a circuit showing a current control driver of a second embodiment of the present invention.
Figure 10:
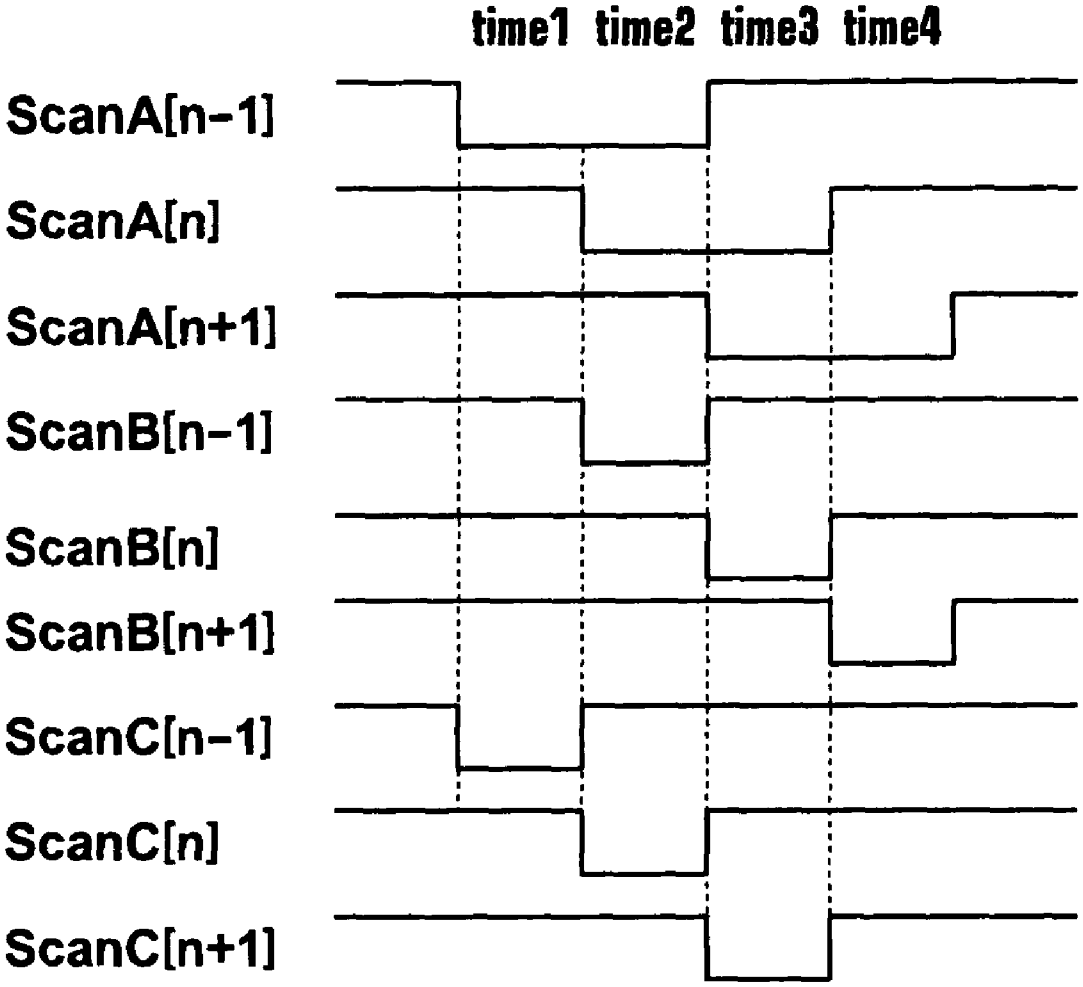
FIG. 10 is a timing chart showing how scanning lines are selected in the circuit in FIG. 9.
Figure 11:
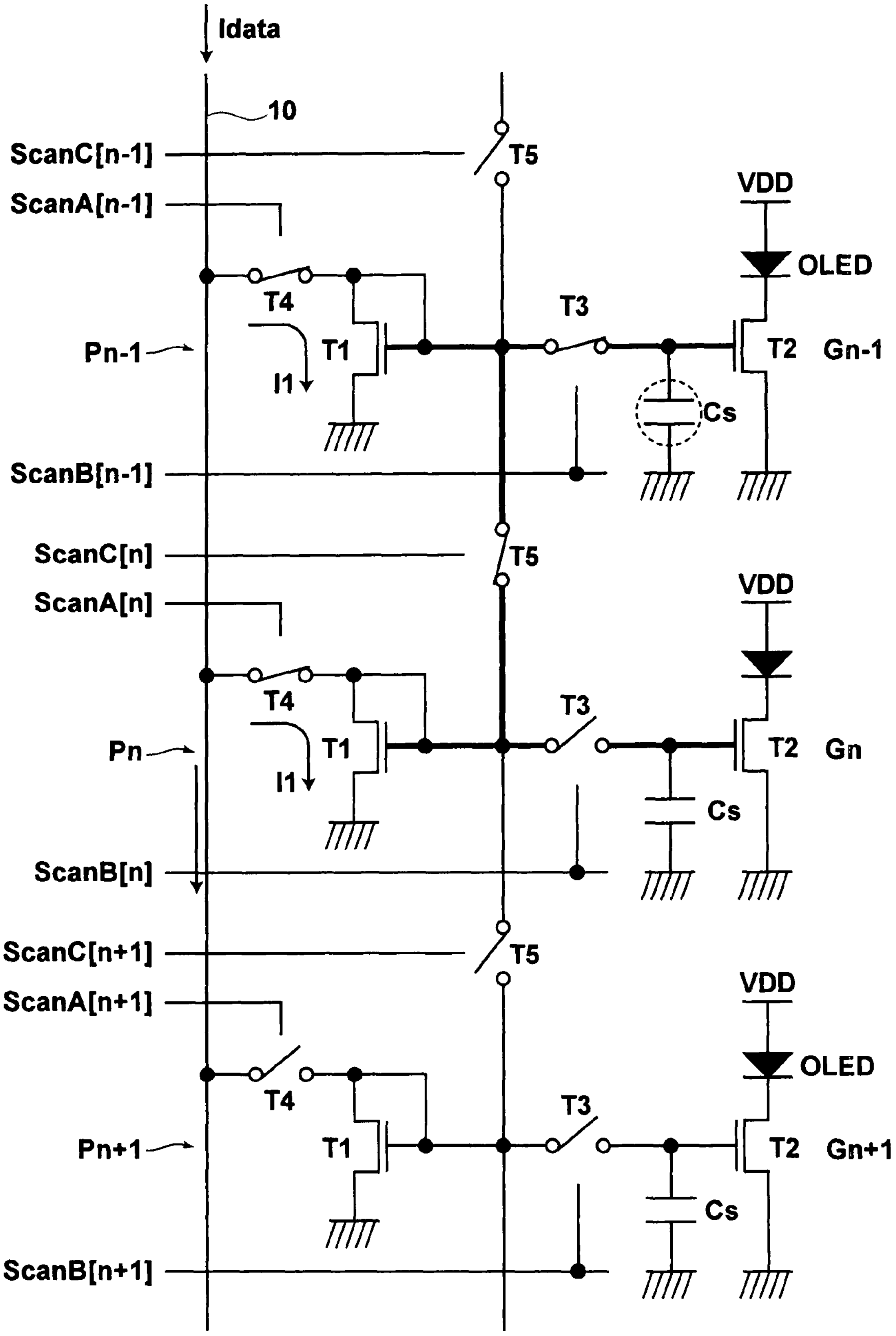
FIG. 11 is a circuit diagram showing a state of operation in the circuit shown in FIG. 9.

A current control driver of a second embodiment of the present invention will be described next with reference to FIGS. 9 to 14. The current control driver in this embodiment is to drive organic EL elements (OLEDs) in an organic EL display device as an example. FIG. 9 shows the configuration of the driver, which is the same as the first embodiment. In FIG. 9 (and hereinafter), the same components as in FIG. 1 have the same reference codes, and detailed description thereof is omitted unless specifically necessary. In the second embodiment, how three scanning lines ScanA, ScanB, and ScanC are selected is different from the first embodiment, and is shown by a timing chart in FIG. 10.

Figure 12:
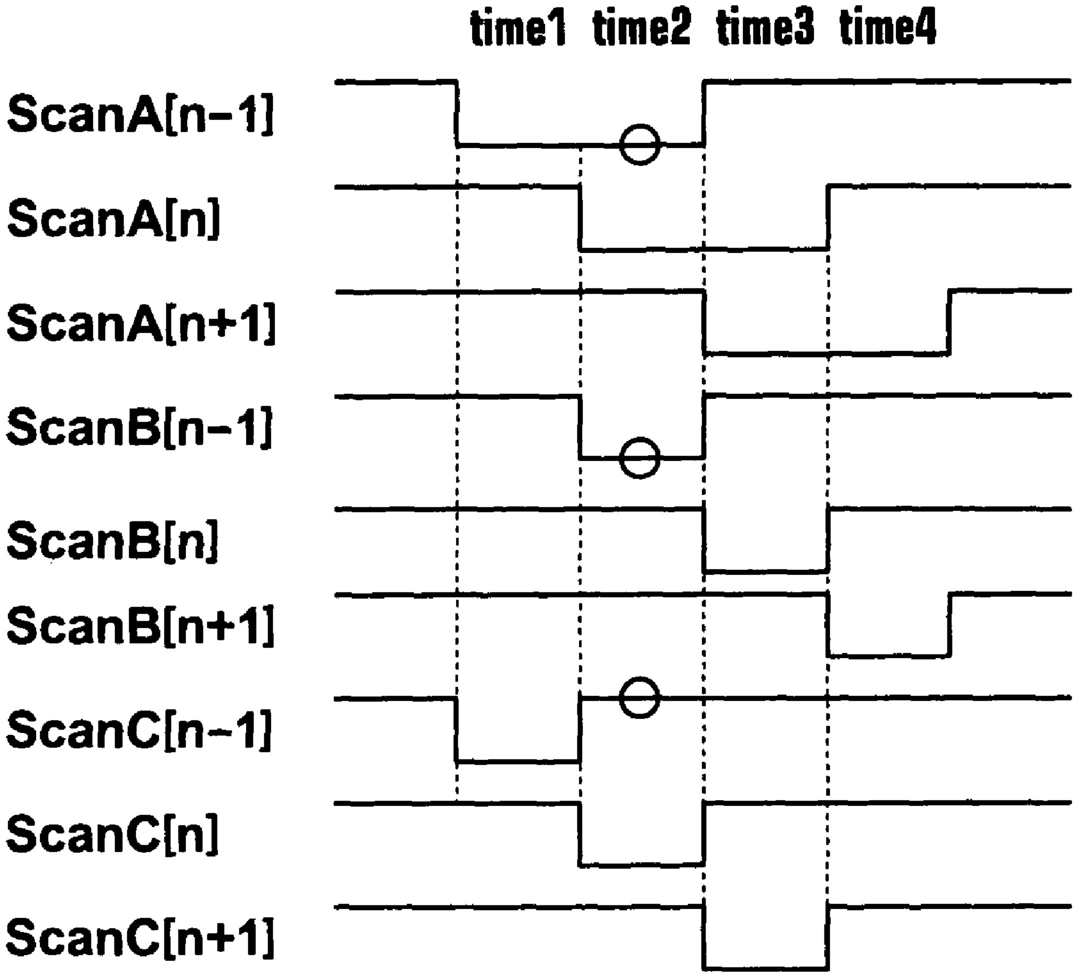
FIG. 12 is a timing chart showing how the scanning lines are selected for the state of operation shown in FIG. 11.
Figure 13:
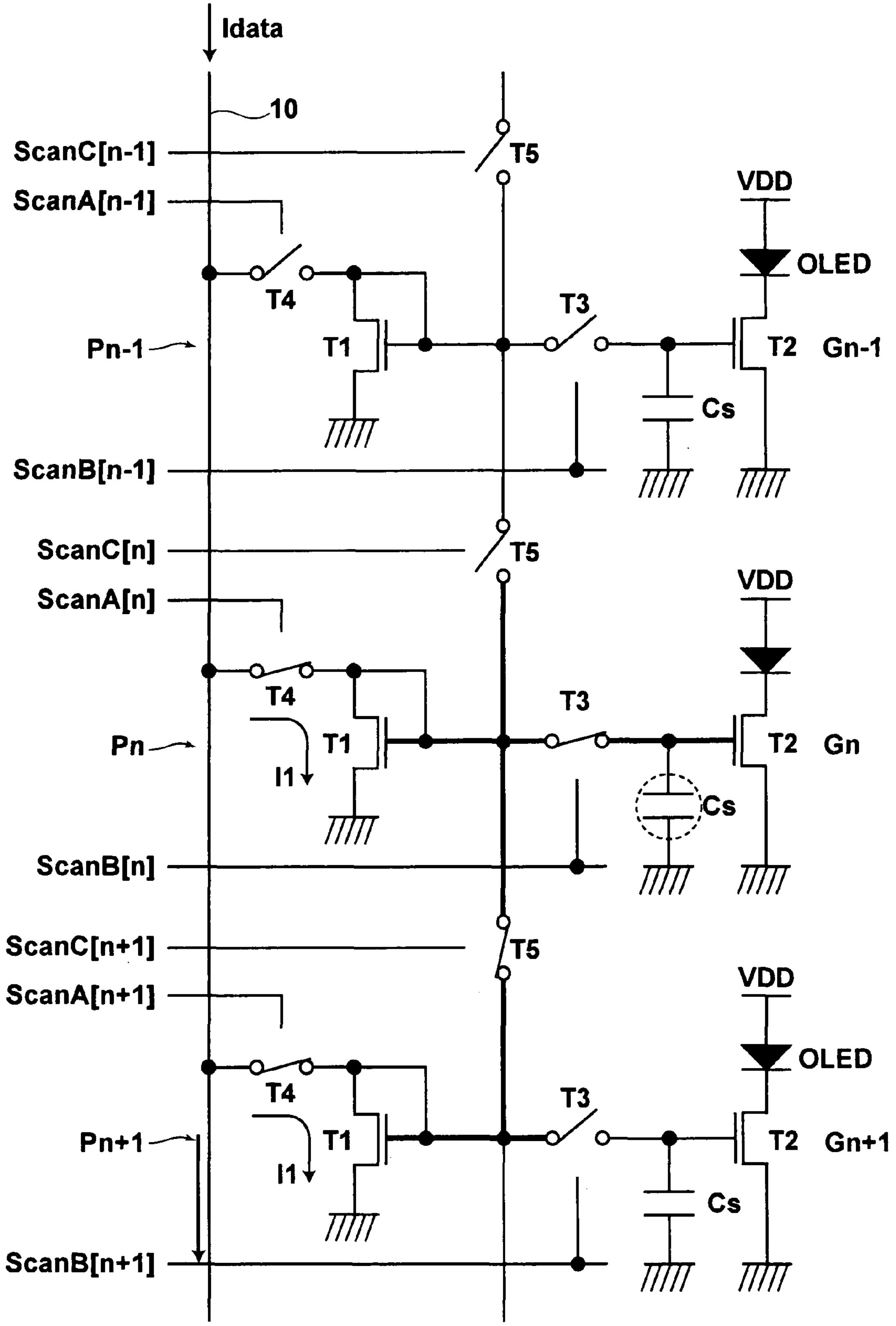
FIG. 13 is a circuit diagram showing another state of operation of the circuit in FIG. 9.

In the current control driver in this embodiment, scanning lines ScanA[n−1] and ScanB[n−1] are selected in a write period time2 as shown by circles in a timing chart in FIG. 12 at the time of writing in a row n−1, for example. A scanning line ScanC[n−1] is not selected in this case. The scanning lines ScanA[n] and ScanC[n] in a row n located immediately after the row n−1 are also selected in the write period time2. Therefore, the circuit is in a state shown in FIG. 11 in the write period time2, and a current Idata in a data line 10 is supplied to T1 of the row n−1 and to T1 of the row n. A voltage occurring at the gate of T1 in the row n is retained by a capacitor Cs in the row n−1 via T5 in the row n.

Figure 14:
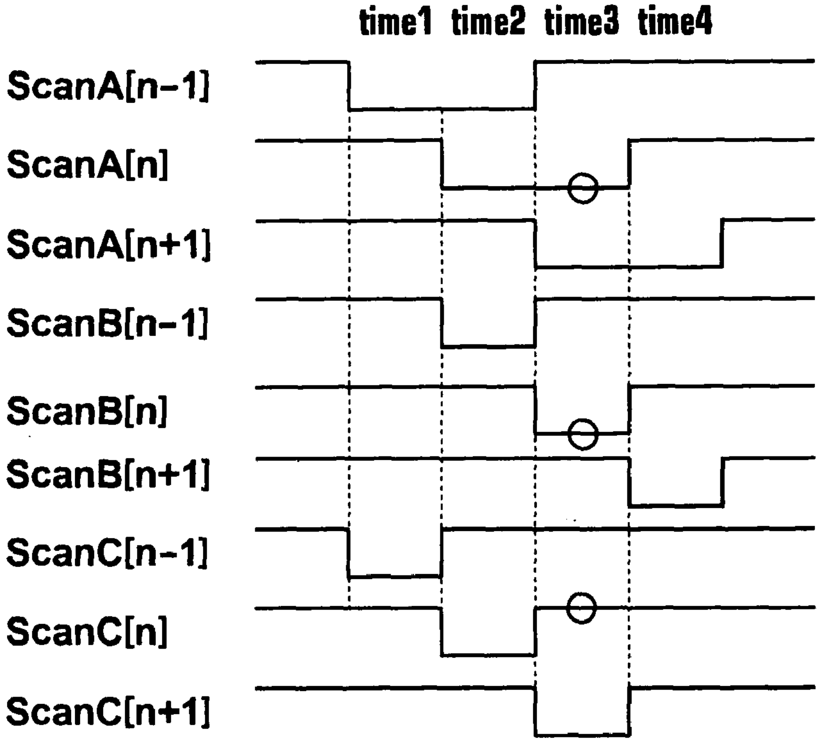
FIG. 14 is a timing chart showing how the scanning lines are selected for the state of operation in the circuit shown in FIG. 13.

At the time of writing in the row n, the scanning lines ScanA[n] and ScanB[n] are selected in a write period time3 as shown by circles in a timing chart in FIG. 14 while the scanning line ScanC[n] is not selected. In the write period time3, scanning lines ScanA[n+1] and ScanC[n+1] are also selected in a row n+1 that immediately follows the row n. Consequently, the circuit is in a state shown by FIG. 13 in the write period time3. A current Idata in the data line 10 is supplied to T1 of the row n and to T1 of the row n+1. A voltage occurring at the gate of T1 in the row n+1 is retained by a capacitor Cs in the row n via T5 of the row n+1.

As has been described above, in this embodiment, letting the current Idata flow through the two T1s allows the larger current to flow in the data line 10. Therefore, writing can be carried out by the accurate current Idata corresponding to desired luminance while effects caused by a wiring capacitance and a driver capacitance can be suppressed. Uneven display (uneven luminance) between pixels caused by variation in a characteristic of T1s can also be reduced, as has been described above.

Figure 15:
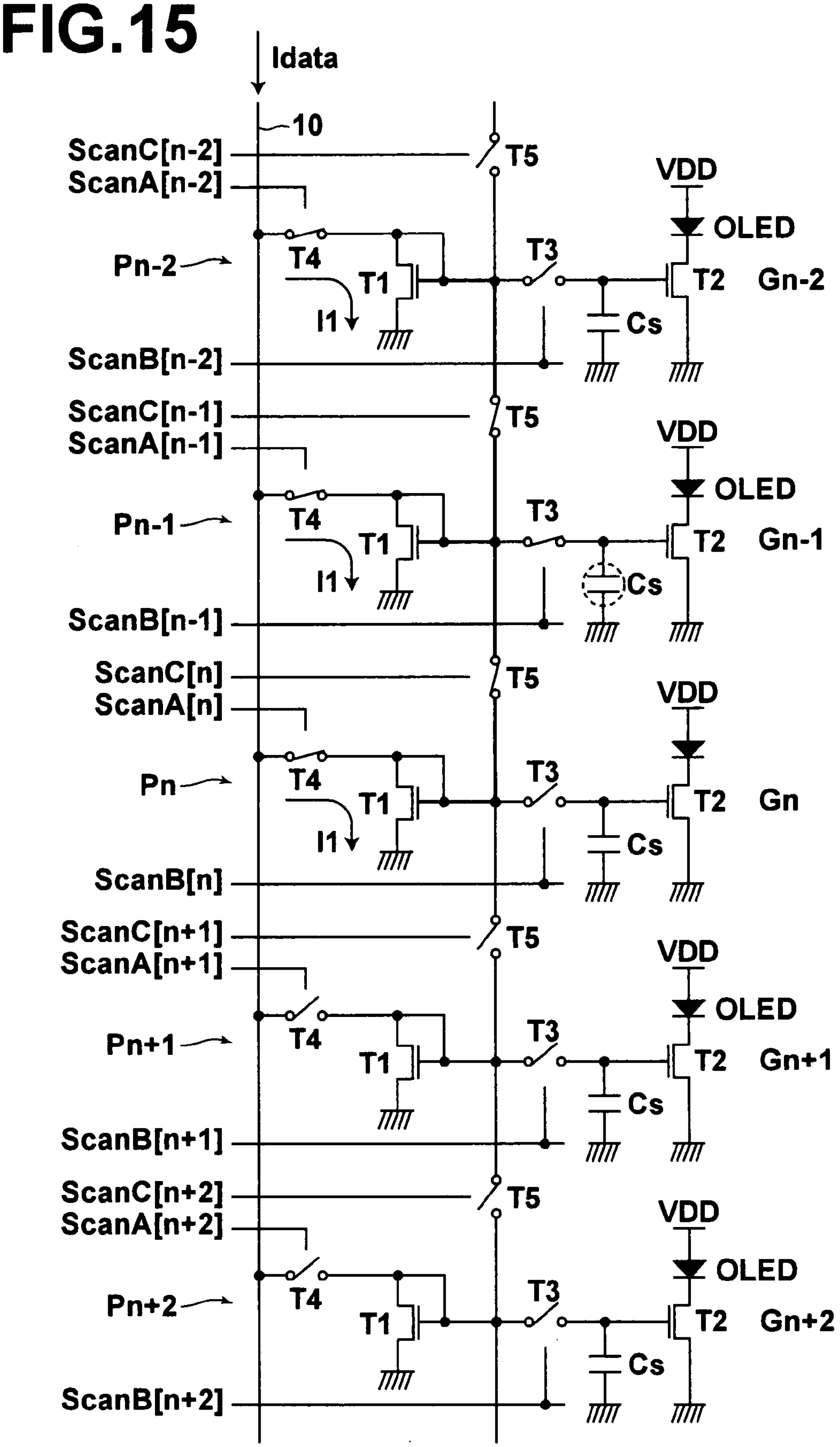
FIG. 15 is a diagram of a circuit showing a current control driver of a third embodiment of the present invention.

A current control driver of a third embodiment of the present invention will be described next with reference to FIGS. 15 to 20. The current control driver in this embodiment is to drive organic EL elements (OLEDs) in an organic EL display device as an example. FIG. 15 shows the configuration of the driver, which is the same as the first embodiment. In the third embodiment, how three scanning lines ScanA, ScanB, and ScanC are selected is different from the first embodiment, and is shown by a timing chart in FIG. 16.

Figure 16:
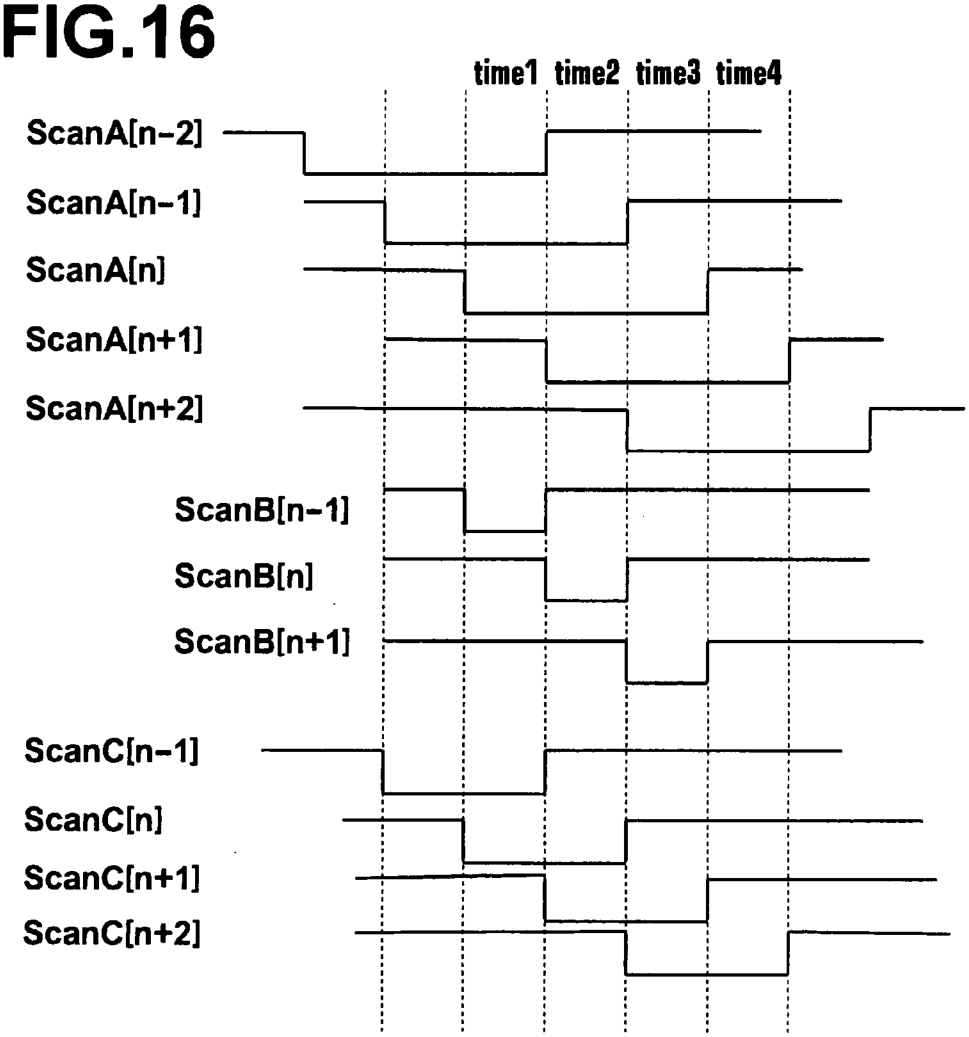
FIG. 16 is a timing chart showing how scanning lines are selected for a state in the circuit shown in FIG. 15.
Figure 17:
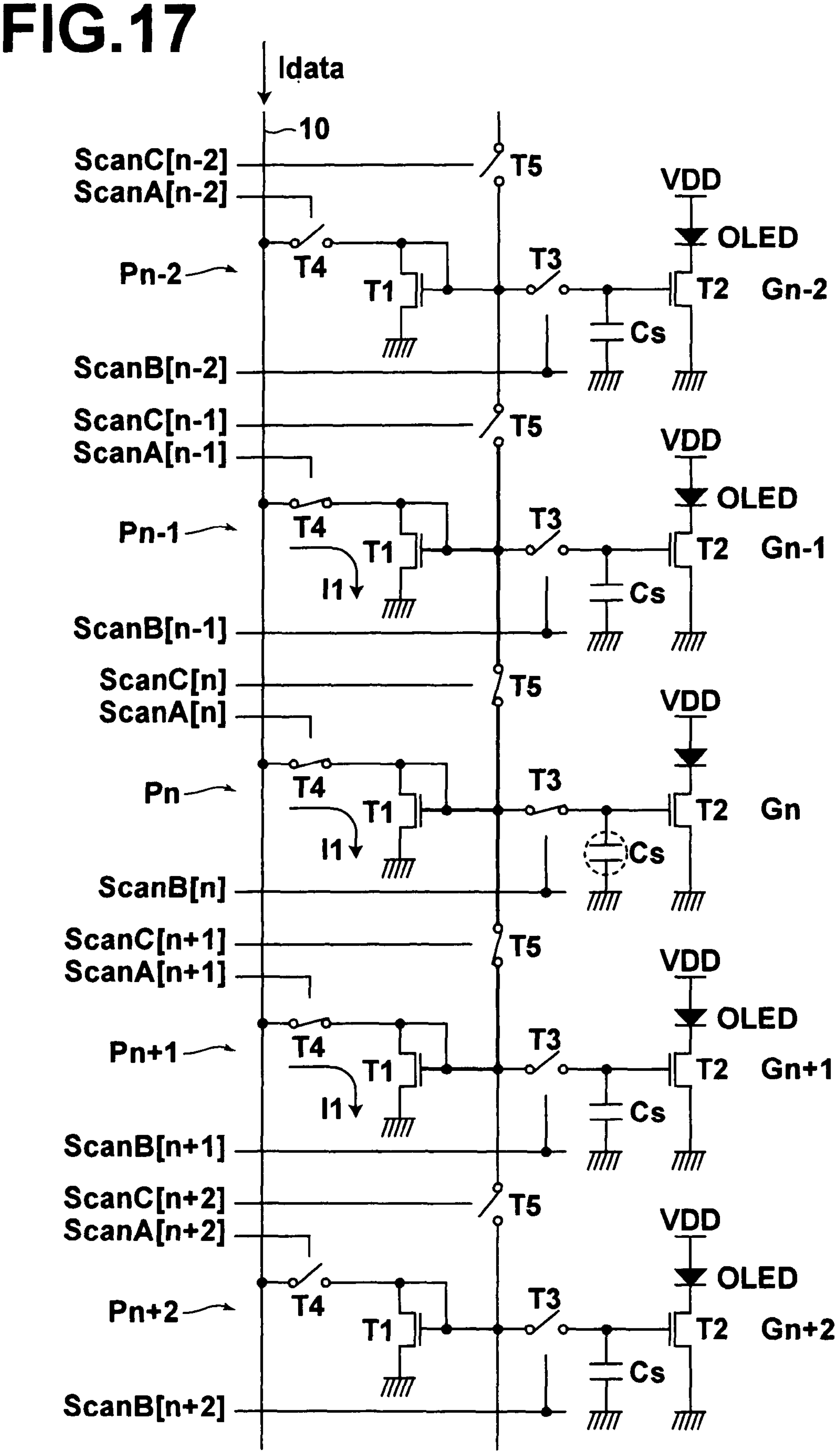
FIG. 17 is a circuit diagram showing another state of operation of the circuit in FIG. 15.

Upon writing in a row n−1 in the current control driver in this embodiment, for example, scanning lines ScanA[n−1], ScanB[n−1], and ScanC[n−1] are all selected in a write period time1 as shown by circles in the timing chart in FIG. 16. A scanning line ScanA[n−2] is also selected in the write period time1 in a row n−2 that immediately precedes the row n−1. In addition, the scanning lines ScanA[n] and ScanC[n] are also selected in a row n that immediately follows the row n−1. Therefore, the circuit is in a state shown by FIG. 15 in the write period time1, and a current Idata in a data line 10 is supplied to T1 in the row n−1 as well as to T1s in the rows n−2 and n.

Figure 18:
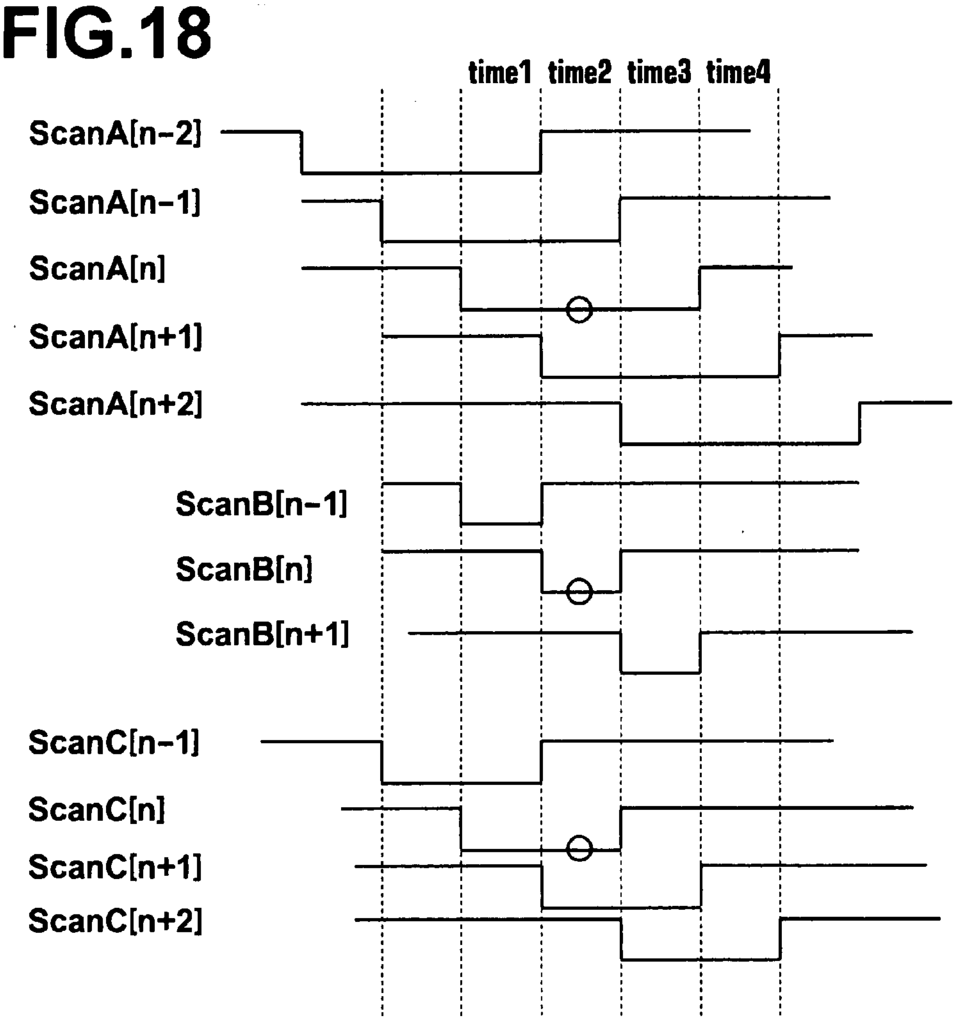
FIG. 18 is a timing chart showing how the scanning lines are selected for the state of operation of the circuit shown in FIG. 17.
Figure 19:
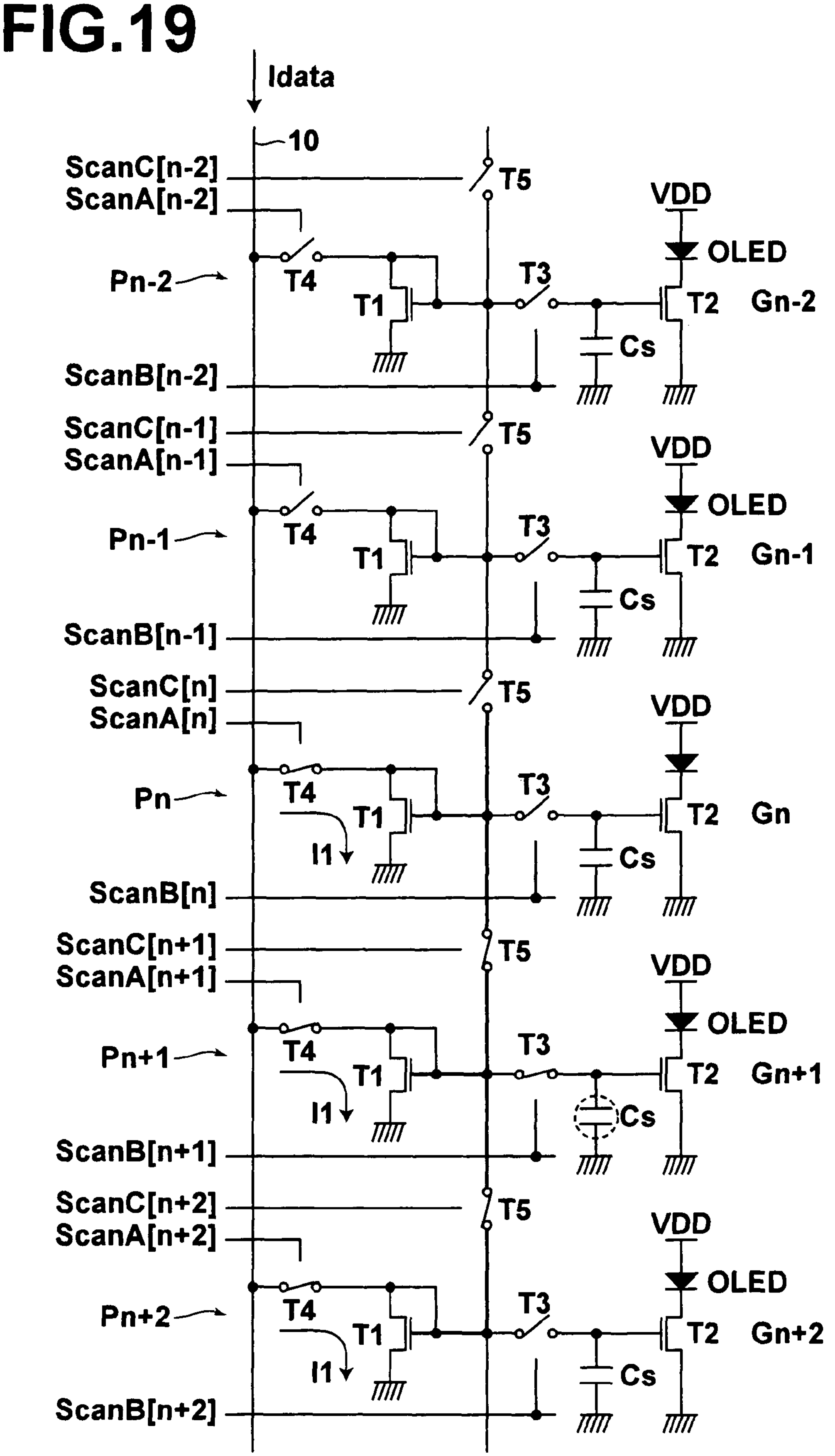
FIG. 19 is a circuit diagram showing still another state of operation of the circuit shown in FIG. 15.

At the time of writing in the row n, the scanning lines ScanA[n] and ScanC[n] as well as a scanning line ScanB[n] are all selected in a write period time2 as shown by circles in a timing chart in FIG. 18. The scanning line ScanA[n−1] in the immediately preceding row n−1 and scanning lines ScanA[n+1] and ScanC[n+1] in the immediately following row n+1 are also selected in the write period time2. Therefore, the circuit is in a state shown by FIG. 17 in the write period time2, and a current Idata in the data line 10 is supplied to T1 of the row n and to T1s in the rows n−1 and n+1.

Figure 20:
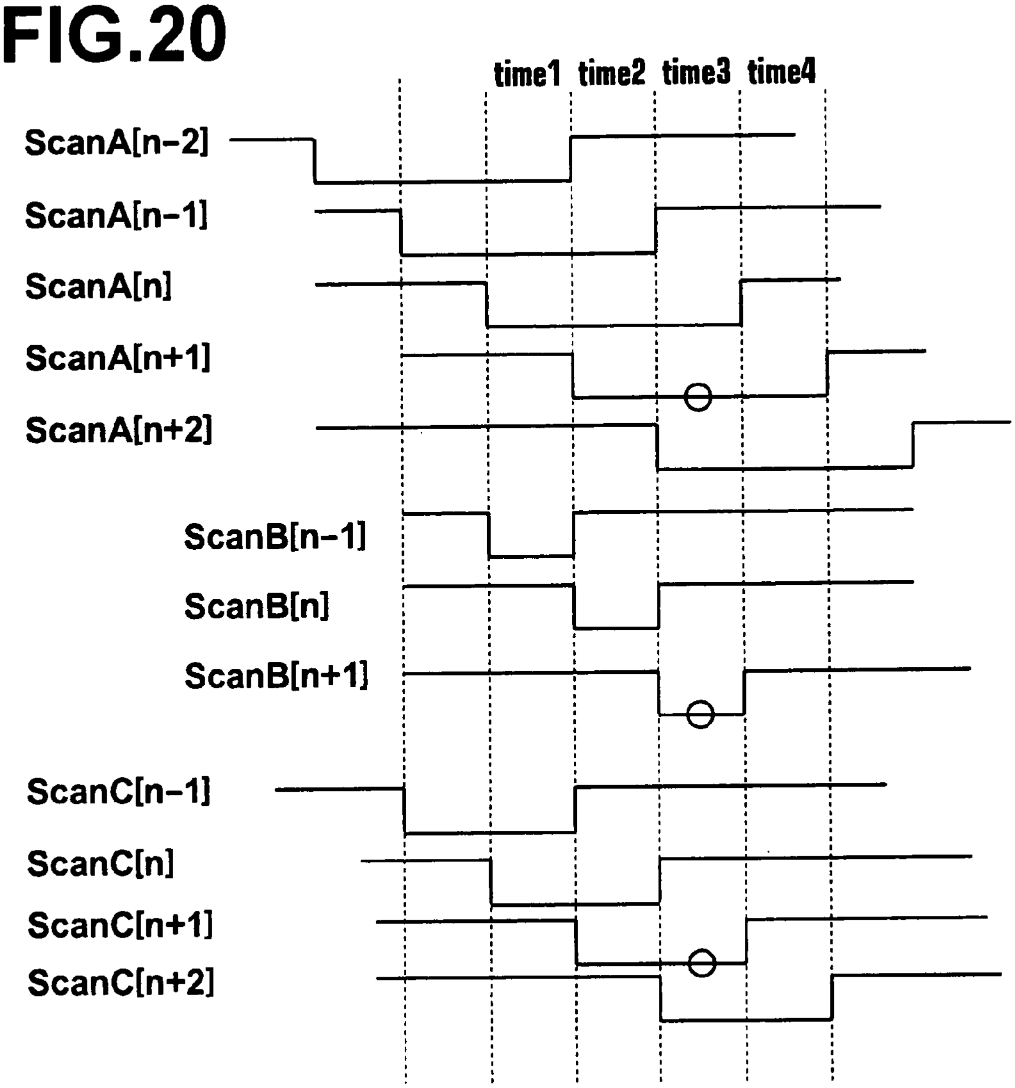
FIG. 20 is a timing chart showing how the scanning lines are selected for the state of operation of the circuit shown in FIG. 19.

Upon writing in the row n+1, the scanning lines ScanA[n+1] and ScanC[n+1] as well as a scanning line ScanB[n+1] are all selected in a write period time3 as shown by circles in a timing chart in FIG. 20. In addition, the scanning line ScanA[n] in the immediately preceding row n and scanning lines ScanA[n+2] and ScanC[n+2] in the immediately following row n+2 are also selected in the write period time3. Therefore, the circuit is in a state shown by FIG. 19, and a current Idata in the data line 10 is supplied not only to T1 in the row n+1 but also to T1s in the rows n and n+2.

As has been described above, upon writing in one of pixels in one of the rows in this embodiment, the current Idata also flows to T1s in the immediately preceding and following rows. Therefore, if I1 denotes a current causing emission of light at a minimum value of the write current Idata, that is, at a minimum luminance value, the data line 10 allows the current that is triple of I1 to flow therethrough. Letting the larger current to flow through the data line 10 in this manner enables writing by the accurate current Idata corresponding to desired luminance while effects caused by a wiring capacitance and a driver capacitance can be suppressed.

Figure 21:
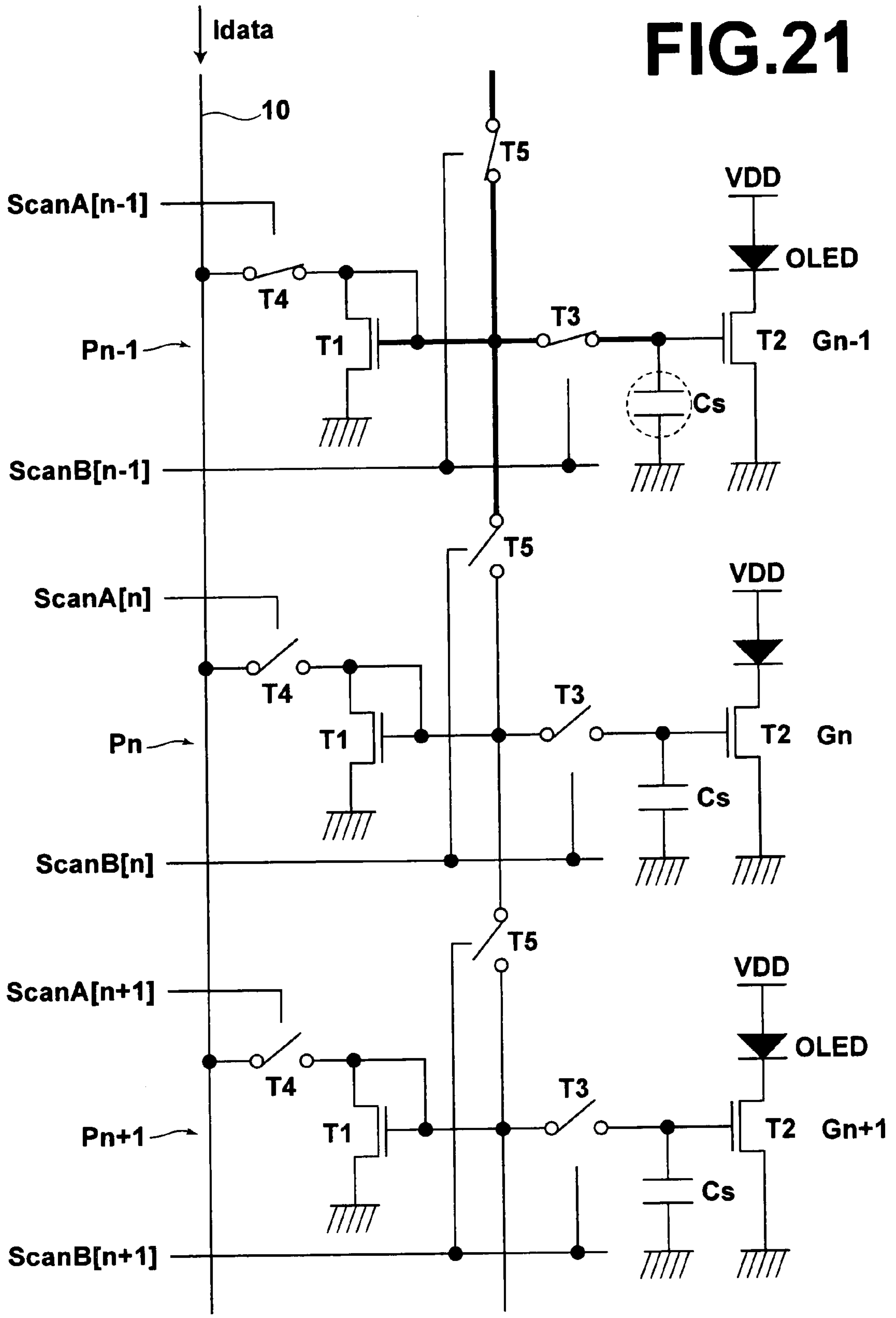
FIG. 21 is a diagram of a circuit showing a current control driver of a fourth embodiment of the present invention.

A current control driver of a fourth embodiment of the present invention will be described with reference to FIGS. 21 to 26. The current control driver in this embodiment is also to drive OLEDs (organic EL elements) in an organic EL display device as an example, and the configuration thereof is shown in FIG. 21. In this embodiment, the scanning line ScanC in the first embodiment is omitted, and T5 as well as T3 in each row are set to be in conductive states or in non-conductive states by a scanning line ScanB of the same row. In the fourth embodiment, how the scanning line ScanB as well as a scanning line ScanA are selected is shown by a timing chart shown in FIG. 22.

Figure 22:
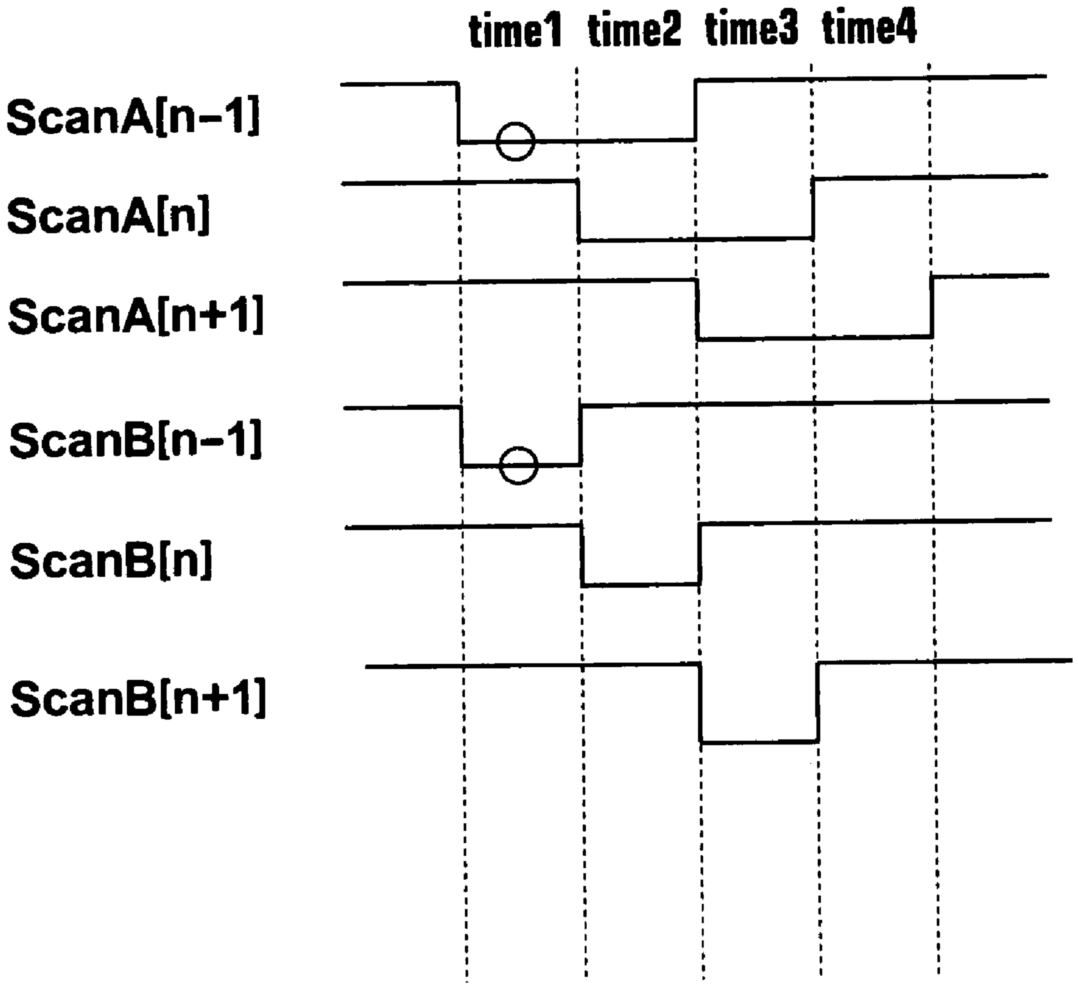
FIG. 22 is a timing chart showing how scanning lines are selected for a state in the circuit shown in FIG. 21.

Upon writing in a row n−1 in this embodiment, two scanning lines ScanA[n−1] and ScanB[n−1] are all selected in a write period time1 as shown by circles in the timing chart in FIG. 22. Transistors T3, T5 as well as T4 in the row n−1 are all in conductive states as shown by FIG. 21.

Figure 23:
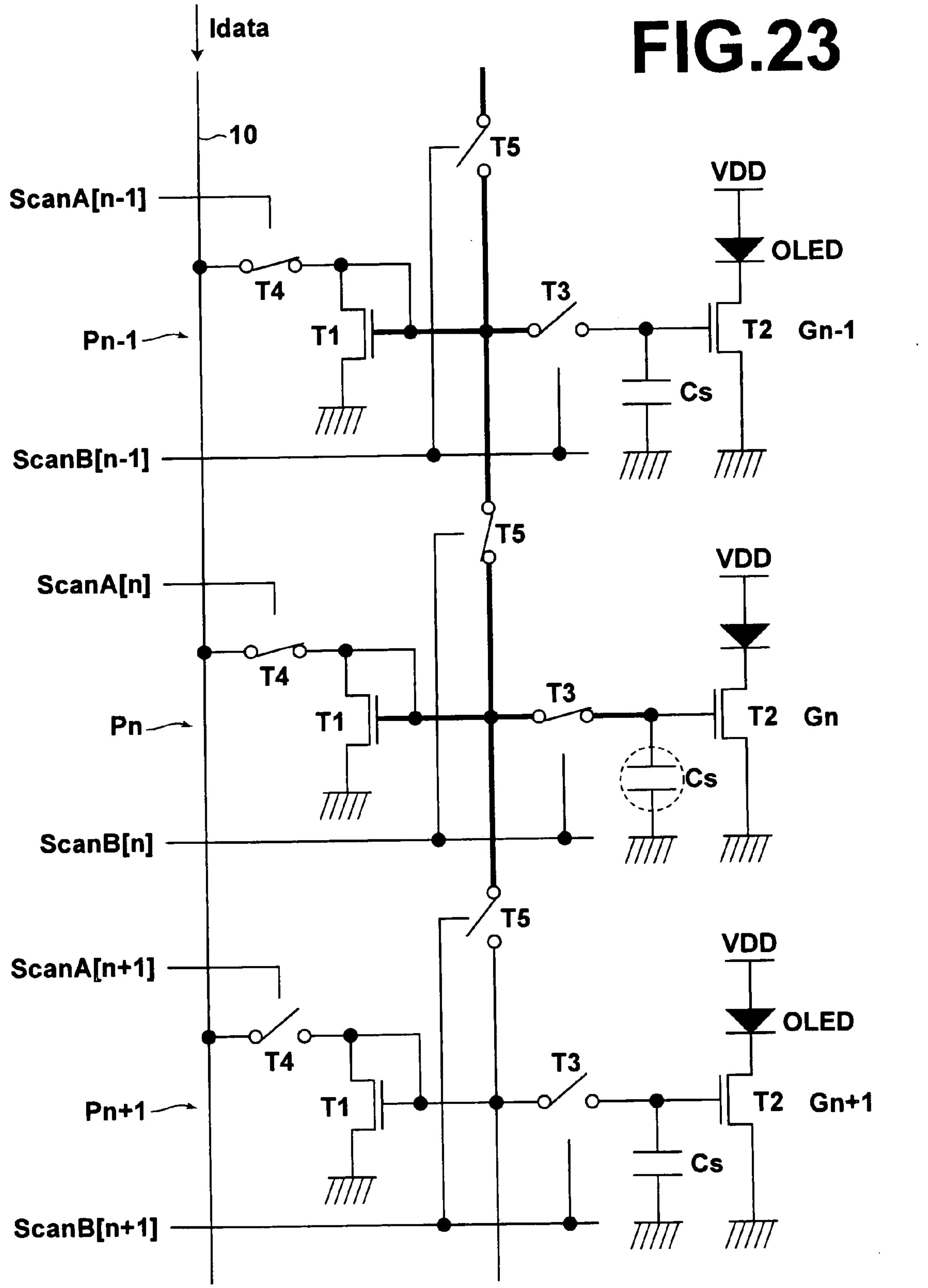
FIG. 23 is a circuit diagram showing another state of operation of the circuit in FIG. 21.
Figure 24:
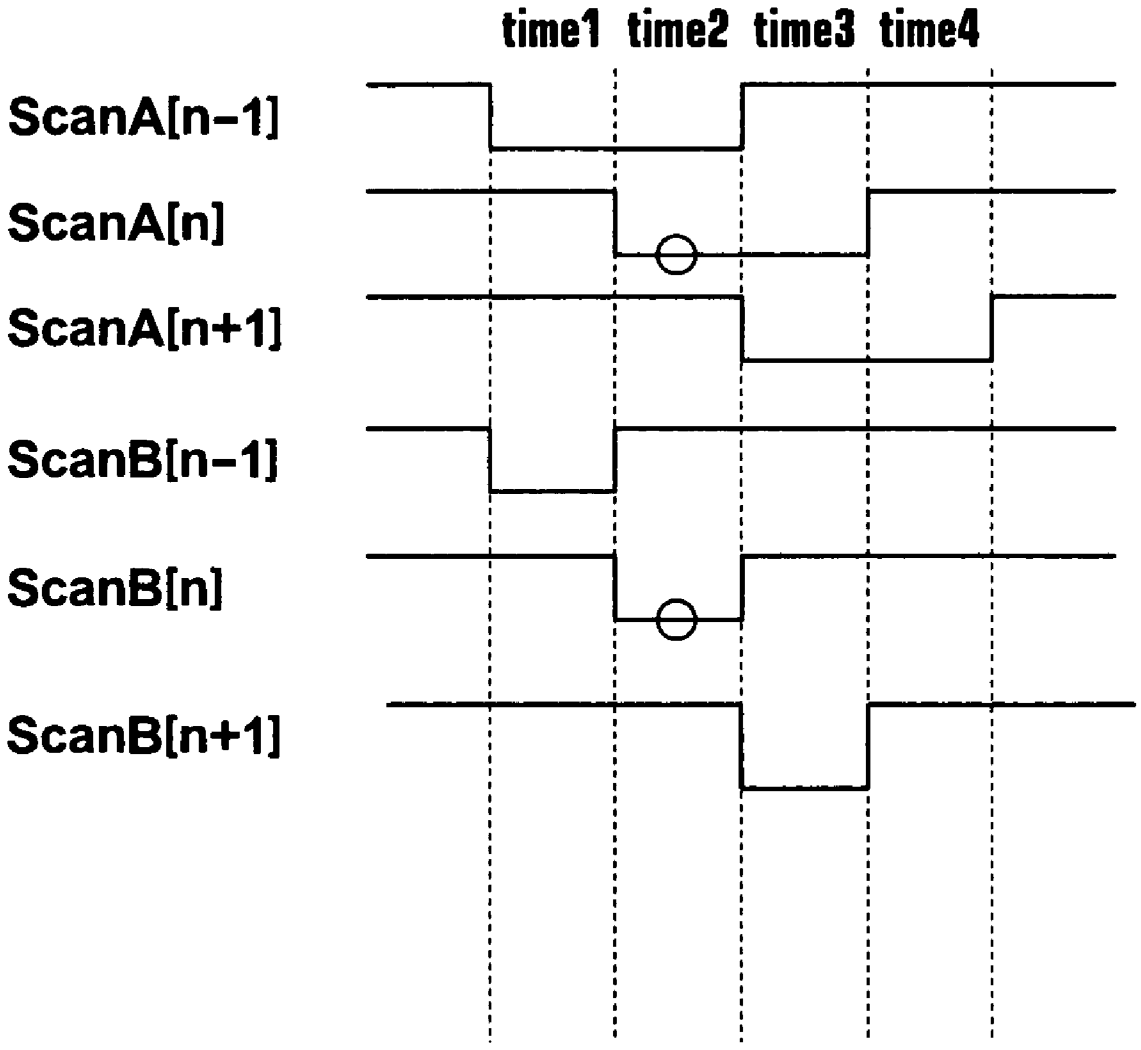
FIG. 24 is a timing chart showing how the scanning lines are selected for the state of operation of the circuit shown in FIG. 23.

At the time of writing in a row n, the two scanning lines ScanA[n] and ScanB[n] are selected in a write period time2 as shown by circles in a timing chart in FIG. 24. In response, transistors T4, T3, and T5 in the row n are all in conductive states as shown by FIG. 23. In addition, the scanning line ScanA[n−1] in the immediately preceding row n−1 is also in the selected state, and T4 in the row n−1 is in the conductive state as shown by FIG. 23. Furthermore, T5 in the row n is in the conductive state due to the scanning line ScanB[n] being selected. Therefore, a current Idata in a data line 10 is supplied to T1 in the row n and to T1 in the row n−1. A voltage occurring in response to the current in T1s is retained by a capacitor Cs in the row n.

Figure 25:
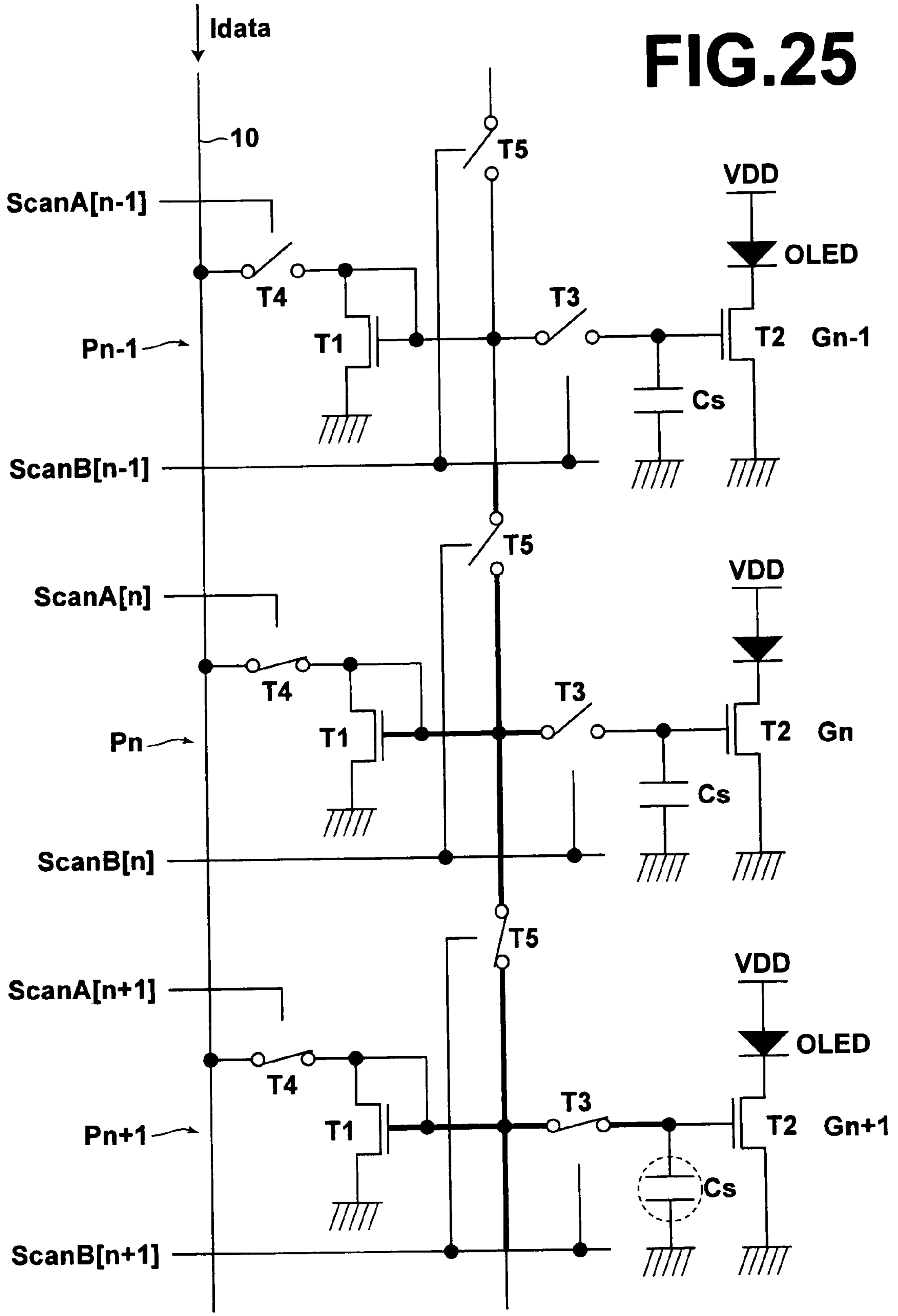
FIG. 25 is a circuit diagram showing still another state of operation of the circuit shown in FIG. 21.
Figure 26:
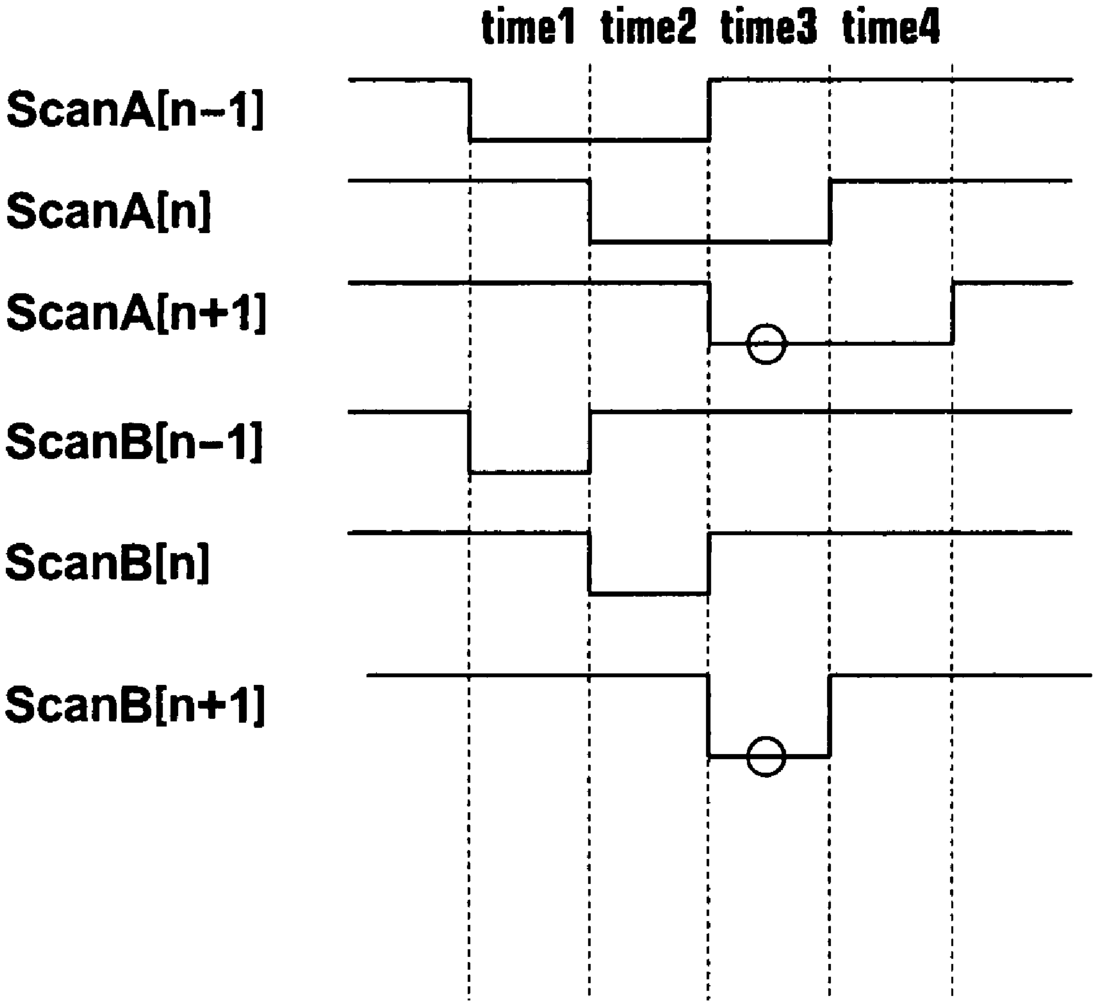
FIG. 26 is a timing chart showing how the scanning lines are selected for the state of operation of the circuit shown in FIG. 25.

At the time of writing in a row n+1, two scanning lines ScanA[n+1] and ScanB[n+1] are selected in a write period time3 as show by circles in a timing chart in FIG. 26. In response, transistors T4, T3, and T5 in the row n+1 are all in conductive states as shown by FIG. 25. Since the scanning line ScanA[n] in the immediately preceding row n is also in the selected state in the write period time3, T4 in the row n is in the conductive state as shown by FIG. 25. Furthermore, the transistor T5 in the row n+1 is conductive due to the scanning line ScanB[n+1] being selected. Therefore, a current Idata in the data line 10 is supplied to T1 in the row n+1 as well as to T1 in the row n. A voltage occurring in response to the current in T1s is retained by a capacitor Cs in the row n+1.

As has been described above, upon writing in a pixel Gn in the row n in this embodiment, the current Idata can flow in T1 of the immediately preceding row n−1. If I1 refers to a current causing emission of light at a minimum value of the write current Idata, that is, at a minimum luminance value, the data line 10 allows the current whose value is double of I1 to flow therethrough. Allowing the larger current to flow through the data line 10 in this manner leads to reduction of effects caused by a wiring capacitance and a driver capacitance and to writing by the accurate current Idata corresponding to desired luminance.

Figure 27:
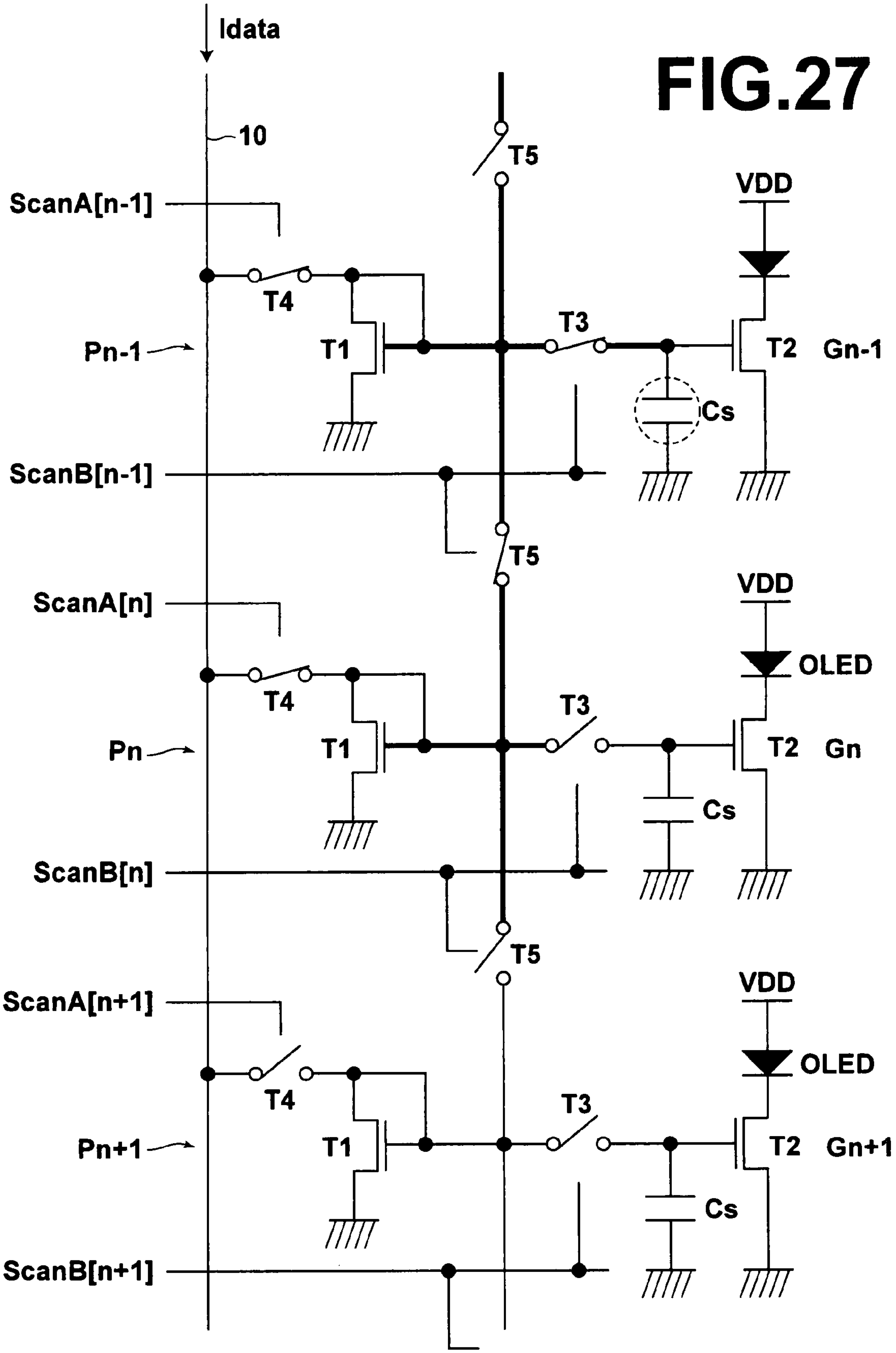
FIG. 27 is a diagram of a circuit showing a current control driver of a fifth embodiment of the present invention.

A current control driver of a fifth embodiment of the present invention will be described below with reference to FIGS. 27 to 30. The current control driver in this embodiment is also to drive OLEDs (organic EL elements) in an organic EL display device as an example, and the configuration thereof is shown in FIG. 27. In this embodiment, the scanning line ScanC in the first embodiment is omitted, and T5 in each row is set to be in a conductive or non-conductive state by a scanning line ScanB of the immediately preceding row. In the fifth embodiment, how the scanning line ScanB as well as a scanning line ScanA are selected is shown by a timing chart shown in FIG. 28.

Figure 28:
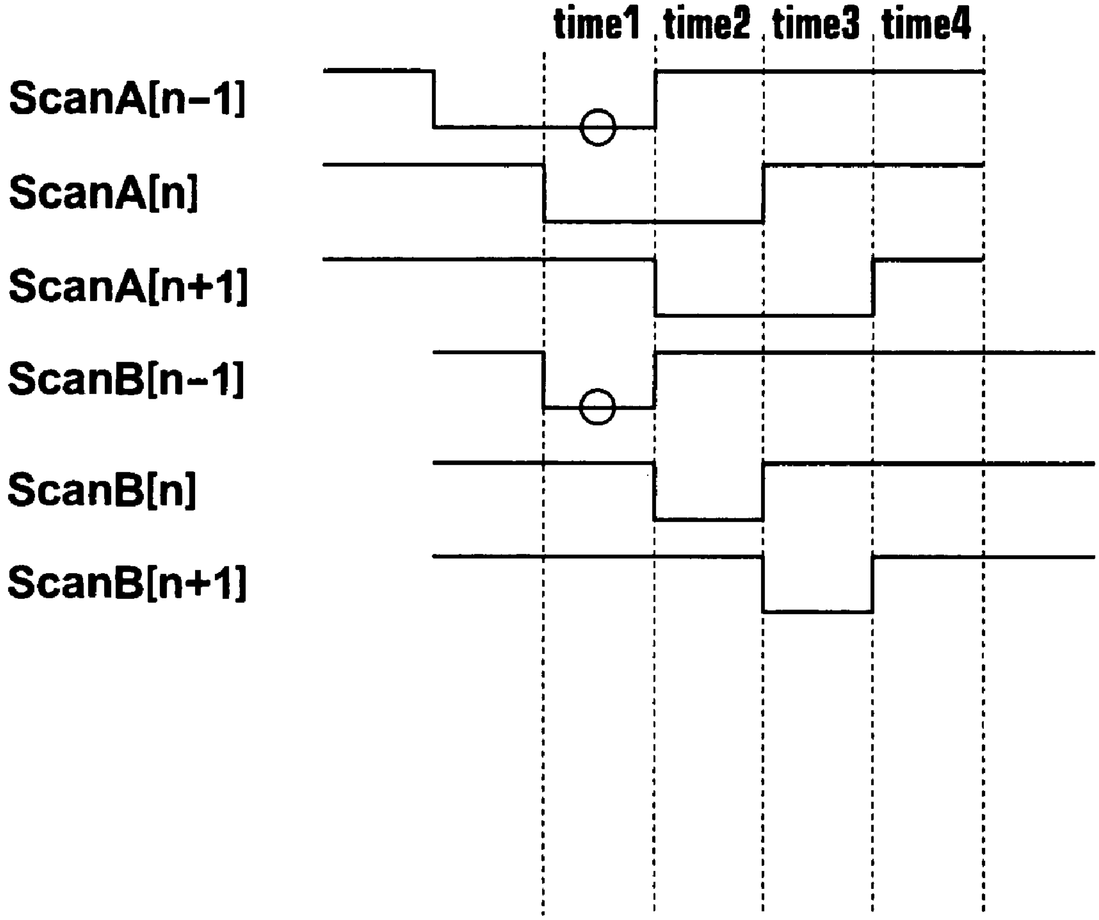
FIG. 28 is a timing chart showing how scanning lines are selected for a state in the circuit shown in FIG. 27.

Upon writing in a row n−1 in this embodiment, scanning lines ScanA[n−1] and ScanB[n−1] are all selected in a write period time1 as shown by circles in a timing chart in FIG. 28. Transistors T5 and T3 in the row n−1 become conductive as shown in FIG. 27. In the write period time1, a transistor T5 in the immediately following row n is set to become conductive by selection of the scanning line ScanB[n−1].

Therefore, a current Idata in a data line 10 is supplied to T1 in the row n−1 and to T1 in the row n in the write period time1. A voltage occurring in response to the current in the two transistors is retained by a capacitor Cs in the row n−1.

Figure 29:
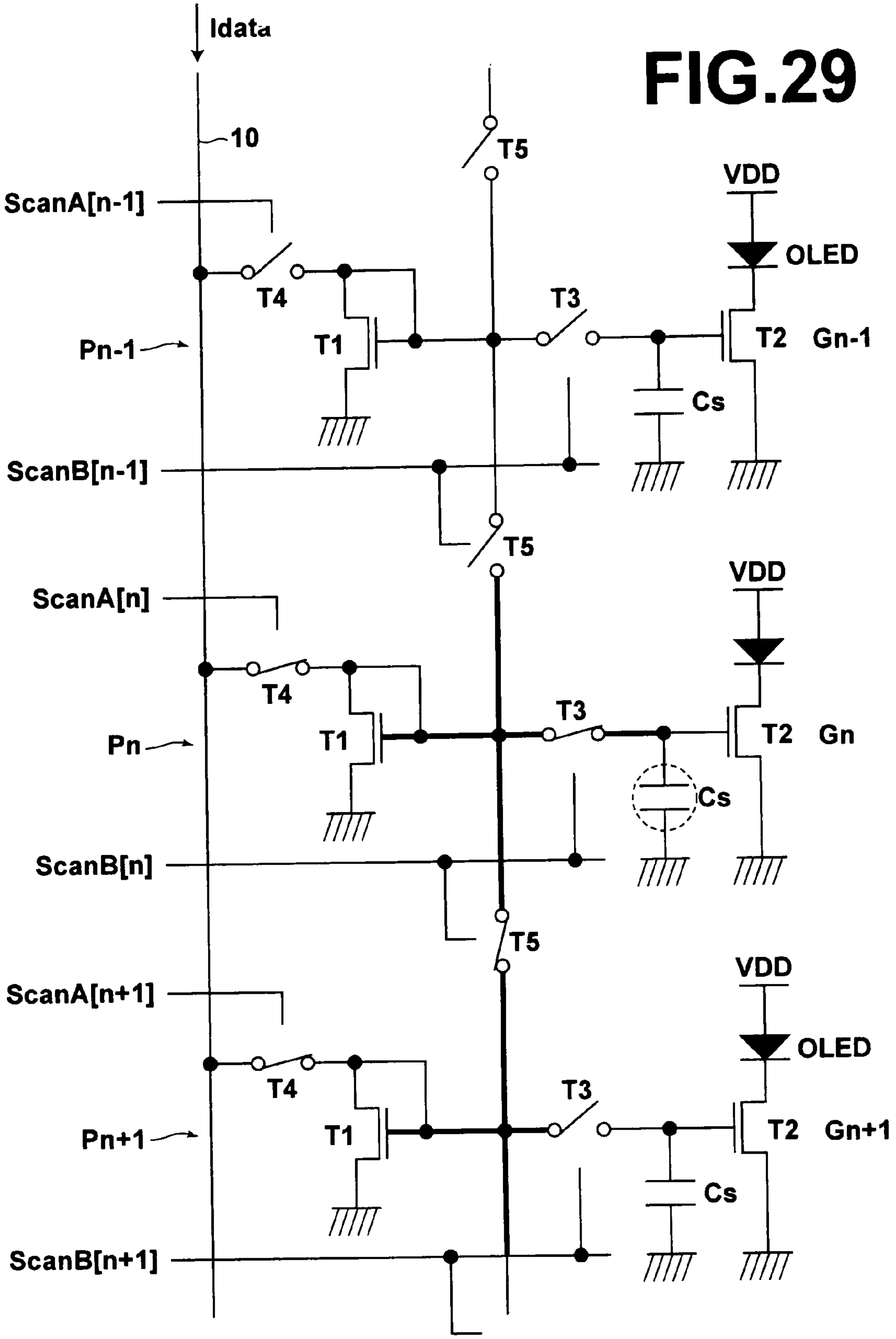
FIG. 29 is a circuit diagram showing another state of operation of the circuit in FIG. 27.
Figure 30:
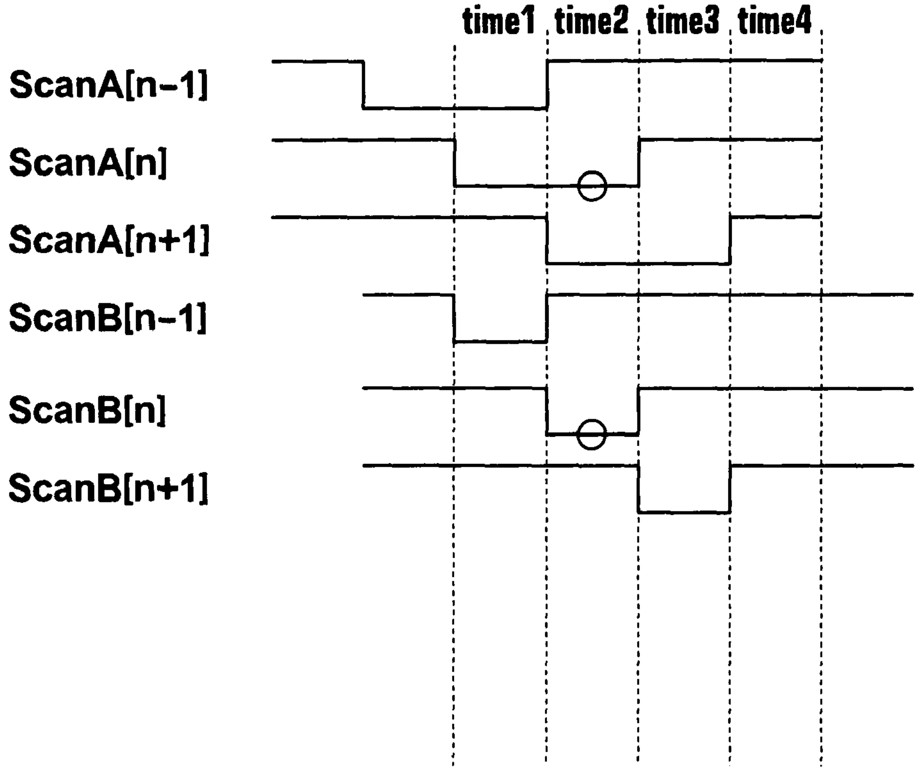
FIG. 30 is a timing chart showing how the scanning lines are selected for the state of operation of the circuit shown in FIG. 29.
Figure 31:
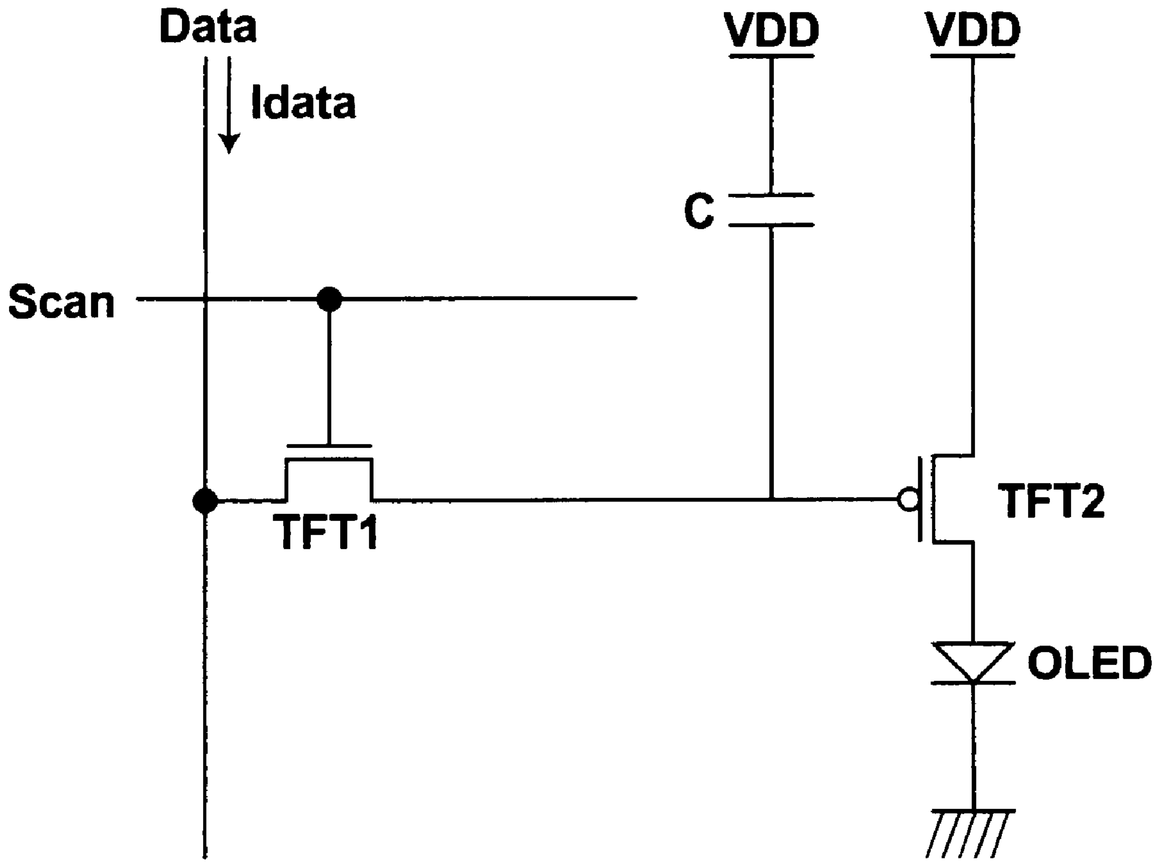
FIG. 31 is a circuit diagram showing an example of a conventional current control driver.

At the time of writing in the row n thereafter, the two scanning lines ScanA[n] and ScanB[n] are all selected in a write period time2 as shown by circles in a timing chart in FIG. 30. In response, transistors T4 and T3 in the row n become conductive as shown in FIG. 29. In the write period time2, a transistor T5 in the immediately following row n+1 is set to become conductive by the scanning line ScanB being selected.

Therefore, a current Idata in the data line 10 is supplied to T1 in the row n and to T1 in the row n+1 in the write period time2, and a voltage occurring in response to the current is retained by a capacitor Cs in the row n.

As has been described above, at the time of writing in a pixel Gn in the row n in this embodiment, the current Idata also flows through T1 in the immediately following row n+1. Therefore, if I1 refers to a current causing emission of light at a minimum value of the write current Idata, that is, at a minimum luminance value, the data line 10 allows the current whose value is double of I1 to flow therethrough. Allowing the larger current to flow through the data line 10 in this manner leads to reduction of effects caused by a wiring capacitance and a driver capacitance and to writing by the accurate current Idata corresponding to desired luminance.

Although the embodiments applied to the display devices using the organic EL elements as light emitting elements have been described above, the present invention can be applied to a display device using other current driving light emitting elements. In addition, the current control drivers of the present invention can be applied not only to such a display device but also to an optical scanning reading apparatus or optical scanning recording apparatus that generates reading light or recording light with constant luminance of a changeable value by sequential scanning of light emitting elements laid out in the form of a matrix, for example. In this case, the effects of the present invention can also be obtained in the same manner.

What is claimed is:

1. A current control driver of an active matrix method in a device in which elements that receive current supply are laid out in the form of a matrix, the elements being selected in the current control driver by sequential line scanning while output currents being controlled by applied currents from a plurality of data lines and supplied respectively to the selected elements, the current control driver comprising an element circuit for each of the elements, the element circuit comprising:

- a converting unit for converting a corresponding one of the applied currents into a voltage;
- a retaining unit for retaining the voltage converted by the converting unit; and
- a driving unit for converting the voltage retained by the retaining unit into a corresponding one of the output currents and supplying the output current, wherein
- the converting unit is shared between two or more different element circuits, and
- two or more of the converting units are connected to the retaining unit of one of the elements during a current supply period for the element by a switch located between the shared converting units.

2. The current control driver as claimed in claim 1, the current control driver having:

- the converting unit comprising a field effect transistor whose drain and gate are electrically short-circuited, the field effect transistor generating the voltage between the gate and the source thereof by the applied current from a corresponding one of the data lines;
- the retaining unit comprising a capacitor that retains the voltage generated between the gate and the source of the field effect transistor; and
- the driving unit comprising a field effect transistor that controls the output current based on the voltage retained by the capacitor.

3. The current control driver as claimed in claim 1, the current control driver having:

- a first scanning switch for selectively conducting the applied current from the data line;
- the converting unit for converting the current via the first scanning switch into the voltage;
- a second scanning switch for selectively supplying the voltage converted by the converting unit;
- the retaining unit for retaining the voltage supplied via the second scanning switch;
- the driving unit for converting the voltage retained by the retaining unit into the output current and supplying the output current; and
- a third scanning switch for allowing the converting unit to be shared by the two or more element circuits.

4. The current control driver as claimed in claim 2, the current control driver having:

- a first scanning switch for selectively conducting the applied current from the data line;
- the converting unit for converting the current via the first scanning switch into the voltage;
- a second scanning switch for selectively supplying the voltage converted by the converting unit;
- the retaining unit for retaining the voltage supplied via the second scanning switch;
- the driving unit for converting the voltage retained by the retaining unit into the output current and supplying the output current; and
- a third scanning switch for allowing the converting unit to be shared by the two or more element circuits.

5. The current control driver as claimed in claim 3, the current control driver having:

the first scanning switch comprising a first field effect transistor connected to a first scanning line;

the converting unit comprising a second field effect transistor whose drain and gate are electrically short-circuited, the second field effect transistor generating the voltage between the gate and the source thereof by the current supplied via the first field effect transistor;

the second scanning switch comprising a third field effect transistor whose gate is connected to a second scanning line;

the retaining unit comprising the capacitor that retains the voltage generated between the gate and the source of the second field effect transistor and supplied via the third field effect transistor;

the driving unit comprising a fourth field effect transistor that is connected serially to a corresponding one of the elements and drives the element based on the voltage retained by the capacitor; and the third scanning switch comprising a fifth field effect transistor whose gate is connected to a third scanning line.

6. The current control driver as claimed in claim 4, the current control driver having:

the first scanning switch comprising a first field effect transistor connected to a first scanning line;

the converting unit comprising a second field effect transistor whose drain and gate are electrically short-circuited, the second field effect transistor generating the voltage between the gate and the source thereof by the current supplied via the first field effect transistor;

the second scanning switch comprising a third field effect transistor whose gate is connected to a second scanning line;

the retaining unit comprising the capacitor that retains the voltage generated between the gate and the source of the second field effect transistor and supplied via the third field effect transistor;

the driving unit comprising a fourth field effect transistor that is connected serially to a corresponding one of the elements and drives the element based on the voltage retained by the capacitor; and the third scanning switch comprising a fifth field effect transistor whose gate is connected to a third scanning line.

7. The current control driver as claimed in claim 1, the current control driver having a configuration such that upon the current supply to each of the selected elements the element circuit thereof shares the converting unit of an immediately preceding one of the element circuits along a scanning direction.

8. The current control driver as claimed in claim 1, the current control driver having a configuration such that upon the current supply to each of the selected elements the element circuit thereof shares the converting unit of an immediately following one of the element circuits along a scanning direction.

9. The current control driver as claimed in claim 1, wherein the transistors comprising the converting unit and the driving unit are N-channel MOS transistors and the transistors comprising the scanning switches are P-channel MOS transistors.

10. A display device having light emitting elements laid out in the form of a matrix in which luminance of the elements changes in accordance with currents applied thereto, the display device comprising a current control driver of an active matrix method in which the elements that receive current supply are selected by sequential line scanning while output currents are controlled by the applied currents from a plurality of data lines and are supplied respectively to the selected elements, the current control driver in the display device comprising a pixel circuit for each of the light emitting elements, the pixel circuit comprising:

a converting unit for converting a corresponding one of the applied currents into a voltage;

a retaining unit for retaining the voltage converted by the converting unit; and a driving unit for converting the voltage retained by the retaining unit into a corresponding one of the output currents and supplying the output current, wherein the converting unit is shared between two or more of the pixel circuits that are different from each other, and two or more of the converting units are connected to the retaining unit of one of the light emitting elements during a current supply period for the light emitting element by a switch located between the shared converting units.

11. The display device as claimed in claim 10, the display device having:

the converting unit comprising a field effect transistor whose drain and gate are electrically short-circuited, the field effect transistor generating the voltage between the gate and the source thereof by the applied current from a corresponding one of the data lines;

the retaining unit comprising a capacitor that retains the voltage generated between the gate and the source of the field effect transistor; and the driving unit comprising a field effect transistor that controls the output current based on the voltage retained by the capacitor.

12. The display device as claimed in claim 10, the display device having:

a first scanning switch for selectively conducting the applied current from the data line;

the converting unit for converting the current via the first scanning switch into the voltage;

a second scanning switch for selectively supplying the voltage converted by the converting unit;

the retaining unit for retaining the voltage supplied via the second scanning switch;

the driving unit for converting the voltage retained by the retaining unit into the output current and supplying the output current; and a third scanning switch for allowing the converting unit to be shared by the two or more of the pixel circuits.

13. The display device as claimed in claim 11, the display device having:

a first scanning switch for selectively conducting the applied current from the data line;

the converting unit for converting the current via the first scanning switch into the voltage;

a second scanning switch for selectively supplying the voltage converted by the converting unit;

the retaining unit for retaining the voltage supplied via the second scanning switch;

the driving unit for converting the voltage retained by the retaining unit into the output current and supplying the output current; and a third scanning switch for allowing the converting unit to be shared by the two or more of the pixel circuits.

14. The display device as claimed in claim 12, the display device having:

the first scanning switch comprising a first field effect transistor connected to a first scanning line;

the converting unit comprising a second field effect transistor whose drain and gate are electrically short-circuited, the second field effect transistor generating the voltage between the gate and the source thereof by the current supplied via the first field effect transistor;

the second scanning switch comprising a third field effect transistor whose gate is connected to a second scanning line;

the retaining unit comprising the capacitor that retains the voltage generated between the gate and the source of the second field effect transistor and supplied via the third field effect transistor;

the driving unit comprising a fourth field effect transistor that is connected serially to a corresponding one of the light emitting elements and drives the light emitting element based on the voltage retained by the capacitor; and the third scanning switch comprising a fifth field effect transistor whose gate is connected to a third scanning line.

15. The display device as claimed in claim 13, the display device having:

the first scanning switch comprising a first field effect transistor connected to a first scanning line;

the converting unit comprising a second field effect transistor whose drain and gate are electrically short-circuited, the second field effect transistor generating the voltage between the gate and the source thereof by the current supplied via the first field effect transistor;

the second scanning switch comprising a third field effect transistor whose gate is connected to a second scanning line;

the retaining unit comprising the capacitor that retains the voltage generated between the gate and the source of the second field effect transistor and supplied vi a the third field effect transistor;

the driving unit comprising a fourth field effect transistor that is connected serially to a corresponding one of the light emitting elements and drives the light emitting element based on the voltage retained by the capacitor; and the third scanning switch comprising a fifth field effect transistor whose gate is connected to a third scanning line.

16. The display device as claimed in claim 10, the display device having a configuration such that upon the current supply to each of the selected light emitting elements the pixel circuit thereof shares the converting unit of an immediately preceding one of the pixel circuits along a scanning direction.

17. The display device as claimed in claim 10, the display device having a configuration such that upon the current supply to each of the selected light emitting elements the pixel circuit thereof shares the converting unit of an immediately following one of the pixel circuits along a scanning direction.

18. The display device as claimed in claim 10, wherein the transistors comprising the converting unit and the driving unit are N-channel MOS transistors and the transistors comprising the scanning switches are P-channel MOS transistors.

19. The current control driver as defined in claim 1, wherein:

the two or more shared converting circuits are arranged in the sequential line scanning direction.

20. The current control driver as defined in claim 1, wherein:

the voltage converted by the two or more shared converting units is supplied to the retaining unit of a single element.

* * * * *